(12) United States Patent
Yan et al.

(10) Patent No.: US 12,425,816 B2
(45) Date of Patent: Sep. 23, 2025

(54) MANAGING A RULE OF A SUSPENDED STATE TERMINAL

(71) Applicant: HUAWEI TECHNOLOGIES CO., LTD., Guangdong (CN)

(72) Inventors: Yali Yan, Shanghai (CN); Zhenggang You, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 1030 days.

(21) Appl. No.: 16/994,044

(22) Filed: Aug. 14, 2020

(65) Prior Publication Data

US 2020/0374671 A1   Nov. 26, 2020

Related U.S. Application Data

(63) Continuation of application No. PCT/CN2019/072032, filed on Jan. 16, 2019.

(30) Foreign Application Priority Data

Feb. 14, 2018   (CN) .......................... 201810151832.1

(51) Int. Cl.
*H04W 4/24*   (2024.01)
*H04M 15/00*   (2024.01)
(Continued)

(52) U.S. Cl.
CPC .............. *H04W 4/24* (2013.01); *H04M 15/66* (2013.01); *H04W 8/22* (2013.01); *H04W 28/06* (2013.01);
(Continued)

(58) Field of Classification Search
CPC ... H04M 15/66; H04M 2215/32; H04W 4/24; H04W 28/06; H04W 8/22; H04W 92/24
(Continued)

(56) References Cited

U.S. PATENT DOCUMENTS 6,456,604 B1 *   9/2002   Lee ....................... H04W 36/06
370/328
8,064,909 B2 *   11/2011   Spinelli ................... H04W 8/26
455/437
(Continued)

FOREIGN PATENT DOCUMENTS

CN   101494848 A   7/2009
CN   103636163 A   3/2014
(Continued)

OTHER PUBLICATIONS

English translation of KR-101539981-B1 by Clarivate Analytics, pp. 1-17. (Year: 2015).*
(Continued)

*Primary Examiner* — David P Zarka
(74) *Attorney, Agent, or Firm* — Fish & Richardson P.C.

(57) ABSTRACT

This application discloses rule management methods and devices. In an example, a first network device receives first indication information. The first indication information indicates that a terminal is in a suspended state. The first network device sends indication information to a second network device, where the indication information indicates that the terminal is in a suspended state. The second network device determines, based on the indication information, to forgo sending a request for updating a policy and charging control rule and/or a quality of service rule related to the terminal.

9 Claims, 14 Drawing Sheets

(51) Int. Cl.
*H04W 8/22* (2009.01)
*H04W 28/06* (2009.01)
*H04W 92/24* (2009.01)

(52) U.S. Cl.
CPC ........ *H04M 2215/32* (2013.01); *H04W 92/24* (2013.01)

(58) Field of Classification Search
USPC ........................................................ 709/201
See application file for complete search history.

(56) References Cited

U.S. PATENT DOCUMENTS

| | | | | |
|---|---|---|---|---|
| 11,096,038 | B2* | 8/2021 | Yang | H04L 5/02 |
| 2005/0220079 | A1* | 10/2005 | Asokan | H04W 76/15 |
| | | | | 370/352 |
| 2007/0211693 | A1* | 9/2007 | Hirsimaki | H04L 69/165 |
| | | | | 370/310 |
| 2011/0317557 | A1 | 12/2011 | Siddam et al. | |
| 2012/0064878 | A1* | 3/2012 | Castro Castro | H04M 15/00 |
| | | | | 455/418 |
| 2014/0040905 | A1* | 2/2014 | Tsunoda | G06Q 10/06311 |
| | | | | 718/103 |
| 2016/0105887 | A1* | 4/2016 | Hsu | H04W 52/0209 |
| | | | | 370/336 |
| 2016/0262058 | A1 | 9/2016 | Jeong et al. | |
| 2017/0163819 | A1 | 6/2017 | Zhou et al. | |
| 2017/0195242 | A1* | 7/2017 | Ibrahim | H04L 65/762 |
| 2017/0265245 | A1 | 9/2017 | Yang et al. | |
| 2017/0280314 | A1 | 9/2017 | Yang et al. | |
| 2018/0332462 | A1 | 11/2018 | Kim et al. | |

FOREIGN PATENT DOCUMENTS

| | | | | |
|---|---|---|---|---|
| CN | 103686657 | A * | 3/2014 | |
| CN | 103781041 | A | 5/2014 | |
| CN | 104982081 | A | 10/2015 | |
| CN | 105101139 | A | 11/2015 | |
| CN | 105635985 | A | 6/2016 | |
| CN | 105900391 | A | 8/2016 | |
| CN | 106656661 | A | 5/2017 | |
| CN | 107079281 | A | 8/2017 | |
| CN | 108307443 | A | 7/2018 | |
| KR | 101539981 | B1 * | 7/2015 | ............ H04W 88/16 |
| WO | WO-2009136776 | A2 * | 11/2009 | ............ H04L 1/0045 |
| WO | 2016070579 | A1 | 5/2016 | |
| WO | 2017078491 | A1 | 5/2017 | |

OTHER PUBLICATIONS

Cisco, Cisco Security Appliance Command Line Configuration Guide, Chapter: Applying QoS Policies, Version 7.2, pp. 1-20 (Jun. 2007) (Year: 2007).*
English translation of WO-2009136776-A2 by Clarivate Analytics, pp. 1-24. (Year: 2009).*
English translation of CN_103686657_A_I by Clarivate Analytics, pp. 1-20. (Year: 2014).*
English translation of KR-101539981-B1 by Google Translate, pp. 1-15. (Year: 2015).*
3GPP TS 29.212 V15.1.0 (Dec. 2017), "3rd Generation Partnership Project;Technical Specification Group Core Network and Terminals;Policy and Charging Control (PCC); Reference points(Release 15)," Dec. 2017, 281 pages.
3GPP TS 23.272 V15.0.0 (Dec. 2017), "3rd Generation Partnership Project;Technical Specification Group Services and System Aspects;Circuit Switched (CS) fallback in Evolved Packet System (EPS);Stage 2(Release 15)," Dec. 2017, 103 pages.
3GPP TS 29.274 V15.2.0 (Dec. 2017), "3rd Generation Partnership Project;Technical Specification Group Core Network and Terminals;3GPP Evolved Packet System (EPS); Evolved General Packet Radio Service (GPRS) Tunnelling Protocol for Control plane (GTPv2-C); Stage 3(Release 15)," Dec. 2017, 380 pages.
3GPP TS 29.213 V15.1.0 (Sep. 2017), "3rd Generation Partnership Project; Technical Specification Group Core Network and Terminals;Policy and Charging Control signalling flows and Quality of Service (QoS) parametermapping(Release 15)," Sep. 2017, 230 pages.
3GPP TS 29.272 V15.2.0 (Dec. 2017), "3rd Generation Partnership Project;Technical Specification Group Core Network and Terminals;Evolved Packet System (EPS);Mobility Management Entity (MME) and Serving GPRS Support Node (SGSN) related interfaces based on Diameter protocol(Release 15)," Dec. 2017, 165 pages.
3GPP TS 23.501 V15.0.0 (Dec. 2017), "3rd Generation Partnership Project;Technical Specification Group Services and System Aspects;System Architecture for the 5G System;Stage 2(Release 15)," Dec. 2017, 181 pages.
3GPP TS 29.512 V0.3.0 (Jan. 2018), "3rd Generation Partnership Project;Technical Specification Group Core Network and Terminals;5G System; Session Management Policy Control Service;Stage 3(Release 15)," Jan. 2018, 30 pages.
Office Action issued in Chinese Application No. 201810151832.1 on Dec. 17, 2019, 15 pages (with English translation).
PCT International Search Report and Written Opinion issued in International Application No. PCT/CN2019/072032 on Mar. 27, 2019, 18 pages (with English translation).
Huawei, "PCC rules modification when UE suspends," 3GPP TSG-CT WG3 Meeting #95, C3-181121, Montreal, Canada, Feb. 26-Mar. 2, 2018, 15 pages.
Extended European Search Report in European Appln No. 19755077.5, dated Mar. 4, 2021, 12 pages.

* cited by examiner

MANAGING A RULE OF A SUSPENDED STATE TERMINAL

CROSS-REFERENCE TO RELATED APPLICATIONS

This application is a continuation of International Application No. PCT/CN2019/072032, filed on Jan. 16, 2019. The International Application claims priority to Chinese Patent Application No. 201810151832.1, filed on Feb. 14, 2018. All of the aforementioned patent applications are hereby incorporated by reference in their entireties.

TECHNICAL FIELD

This application relates to the field of communications technologies, and in particular, to a rule management method and a device.

BACKGROUND

A policy and charging control (PCC) architecture defined by the 3rd generation partnership project (3GPP) may offer quality of service (QoS) control and policy and charging control over network resources used by a user. A policy and charging rules function (PCRF) makes a PCC rule and a QoS rule for a user service based on information provided by an application function (AF), a subscription profile repository (SPR)/UDR, an online charging system (OCS) and/or a Radio Access Network (RAN) congestion awareness function (RCAF).

In a PCC architecture shown in FIG. 1, a PCRF sends a QoS rule to a bearer binding and event report function (BBERF) by using a Gxx interface, and the BBERF controls QoS of a user. The PCRF sends a PCC rule to a policy and charging enforcement function (PCEF) by using a Gx interface, and the PCEF controls a charging policy of a user service. The PCEF is disposed in a packet data network gateway (P-GW), the BBERF is disposed in a serving gateway (S-GW), and the PCEF and the BBERF (that is, the P-GW and the S-GW) are connected to each other by using an S5/S8 interface based on PMIP. The PCC architecture shown in FIG. 1 also includes SCEF, AN-GW, TDF, PFDF, OFCS, TSSF and interfaces such as Np, Sp/Ud, Rx, Nt, Nu, Sy, St, Gyn, Sd, Gw, Gy, Gwn, Gzn, and Gz.

Alternatively, the bearer binding function may be performed by the PCEF. In other words, the S-GW does not include the BBERF. The PCEF and the S-GW (that is, the P-GW and the S-GW) are connected to each other by using an S5/S8 interface based on a GPRS tunnelling protocol (GTP). The PCRF sends the PCC rule to the PCEF by using the Gx interface. According to protocol specifications, a request sent by the PCRF to the PCEF is a policy and charging control rule installing and/or removing request, which is used to request to install or update the PCC rule.

When an event that triggers a change in the PCC rule and the QoS rule occurs, for example, when user traffic exceeds a preset value, there is a need to limit the user traffic. The PCEF or the BBERF reports the trigger event to the PCRF. The PCRF updates the PCC rule and the QoS rule, and requests the PCEF and/or the BBERF to execute a new rule.

For a terminal that does not support a dual transfer mode (DTM), when the terminal falls back to a 2G network from a 3G/4G network due to a call, a 4G network session and a related bearer of the terminal are suspended, and in this case, the terminal cannot receive downlink data.

If the PCC architecture includes the BBERF, and the terminal has been suspended when the PCRF delivers a new PCC rule and a new QoS rule, the BBERF replies to the PCRF with an update failure because the BBERF cannot update the bearer of the terminal. However, the PCRF does not know that the update failure is caused because the terminal is suspended, and redelivers a request for updating the QoS rule until update succeeds. Consequently, signaling interaction on the Gxx interface is excessively frequent, and a large quantity of resources are wasted.

If the PCC architecture does not include the BBERF, and the terminal has been suspended when the PCRF sends a request for updating the PCC rule to the PCEF, the PCEF replies to the PCRF with an update failure because the PCEF cannot update the bearer of the terminal. However, the PCRF redelivers a request for updating the PCC rule and/or the QoS rule until update succeeds. Therefore, signaling interaction on the Gx interface is excessively frequent, and a large quantity of resources are wasted.

SUMMARY

This application provides a rule management method and a device, so as to avoid a case in which when a terminal cannot receive downlink data, and there is a need to update a PCC rule and/or a QoS rule of the terminal, resources are wasted due to constant signaling interaction between network devices.

According to a first aspect, this application provides a rule management method, including:

receiving, by a first network device, first indication information, where the first indication information is used to indicate that a terminal is in a suspended state; sending, by the first network device, second indication information to a second network device, where the second indication information is used to indicate that the terminal is in a suspended state; and determining, by the second network device based on the second indication information, not to send a request for updating a policy and charging control rule and/or a quality of service rule related to the terminal.

Optionally, the first network device may be a PCEF, or the first network device is a BBERF, and the second network device is a PCRF.

In the foregoing method, after receiving the indication information indicating that the terminal is in a suspended state, the second network device temporarily does not send the request for updating the PCC rule and/or the QoS rule. Therefore, a problem in the prior art that a second network device constantly delivers a request for updating a PCC rule and/or a QoS rule related to a terminal, and a first network device constantly replies with an update failure is resolved, signaling interaction is reduced, and resource utilization is improved.

In a possible implementation, if the first network device receives third indication information after sending the second indication information to the second network device, and the third indication information is used to indicate status resumption of the terminal, the first network device may send fourth indication information to the second network device, where the fourth indication information is used to indicate status resumption of the terminal, so that when there is a need to update the policy and charging control rule and/or the quality of service rule of the terminal, the second network device sends a request for updating the policy and charging control rule or the quality of service rule of the terminal to the first network device.

In a possible implementation, before the first network device sends the second indication information to the second network device, the first network device may receive a first request sent by the second network device, where the first request is used to request to install or update the policy and charging control rule or the quality of service rule of the terminal.

In the foregoing embodiment, when the terminal is suspended, if the first network device receives a request that is used for updating the rule and that is sent by the second network device, the first network device reports status information of the terminal to the second network device, to avoid a case in which the second network device repeatedly sends the request for updating the rule, and reduce signaling interaction.

In a possible implementation, the first request is further used to request subscription to information indicating that the terminal resumes to a normal state from a suspended state, so that when the terminal resumes to a normal state from a suspended state, the first network device sends status information of the terminal to the second network device; or the first request is further used to request subscription to status information of the terminal, so that when a status of the terminal changes, the first network device sends the status information of the terminal to the second network device.

In the foregoing embodiment, the second network device may send the request for updating the rule and the request for subscribing to a status of the terminal to the first network device by using same signaling, thereby avoiding frequent signaling interaction, and ensuring time effectiveness of policy and charging control and service requirement control of the terminal.

In a possible implementation, before the first network device sends the second indication information to the second network device, the first network device may receive a second request sent by the second network device, where the second request is used to subscribe to status information of the terminal, so that when a status of the terminal changes, the first network device sends the status information of the terminal to the second network device; or the second request is used to subscribe to information indicating that the terminal resumes to a normal state from a suspended state, so that when the terminal resumes to a normal state from a suspended state, the first network device sends status information of the terminal to the second network device.

The foregoing embodiment helps the second network device immediately obtain the information indicating status resumption of the terminal, and further helps the second network device immediately send the request for updating the PCC rule or the QoS rule of the terminal after the terminal resumes to a normal state, thereby ensuring time effectiveness of policy and charging control and service requirement control of the terminal.

According to a second aspect, this application provides a rule management method, including:

receiving, by a first network device, first indication information, where the first indication information is used to indicate that a terminal is in a suspended state;

receiving, by the first network device, a request that is used for updating a policy and charging control rule or a quality of service rule of the terminal and that is sent by a second network device;

storing, by the first network device, a policy and charging control rule or a quality of service rule that is updated based on the request; and when the first network device receives second indication information, executing, by the first network device for the terminal, the policy and charging control rule or the quality of service rule of the terminal that is updated based on the request, where the second indication information is used to indicate status resumption of the terminal.

In a possible implementation, if the first network device does not receive the second indication information within a preset time, the first network device sends third indication information to the second network device, where the third indication information is used to indicate that the terminal is in a suspended state, so that the second network device does not send a request for updating the policy and charging control rule or the quality of service rule of the terminal.

In a conventional PCC architecture, after receiving the request for updating the PCC rule or the QoS rule, a BBERF or a PCEF executes a new charging rule for the terminal based on an updated rule, and provides new quality of service. If the new rule fails to be executed, the BBERF or the PCEF reports an update failure to a PCRF, but does not store the updated rule. However, in the foregoing embodiment of this application, after the BBERF or the PCEF receives the request for updating the PCC rule or the QoS rule, if the terminal is in a suspended state, and therefore the BBERF or the PCEF cannot immediately execute the updated rule, the BBERF or the PCEF first stores the updated rule, and does not execute a new rule until the terminal resumes to a normal state. According to the method, signaling interaction is reduced, and waste of resources is avoided.

According to a third aspect, this application provides a first network device, where the first network device includes a receiving unit and a sending unit. The receiving unit and the sending unit are configured to perform functions performed by the first network device in any one of the first aspect or the possible implementations of the first aspect.

According to a fourth aspect, this application provides a second network device, where the second network device includes a receiving unit and a determining unit. Further, the second network device may further include a sending unit. The receiving unit, the determining unit, and the sending unit are configured to perform functions performed by the second network device in any one of the first aspect or the possible implementations of the first aspect.

According to a fifth aspect, this application provides a first network device, where the first network device includes a receiving unit, a storage unit, and an execution unit. Further, the first network device may further include a sending unit. The receiving unit, the storage unit, the execution unit, and the sending unit are configured to perform functions performed by the first network device in any one of the second aspect or the possible implementations of the second aspect.

According to a sixth aspect, this application provides a first network device, where the first network device includes a processor, and a memory and a transceiver that are separately connected to the processor. The processor is configured to read a computer program prestored in the memory, to perform functions performed by the first network device in any one of the first aspect or the possible implementations of the first aspect. For details, refer to detailed descriptions in the method embodiments. Details are not described herein again.

According to a seventh aspect, this application provides a second network device, where the second network device includes a processor, and a memory and a transceiver that are separately connected to the processor. The processor is configured to read a computer program prestored in the memory, to perform functions performed by the second network device in any one of the first aspect or the possible implementations of the first aspect. For details, refer to detailed descriptions in the method embodiments. Details are not described herein again.

According to an eighth aspect, this application provides a first network device, where the first network device includes a processor, and a memory and a transceiver that are separately connected to the processor. The processor is configured to read a computer program prestored in the memory, to perform functions performed by the first network device in any one of the second aspect or the possible implementations of the second aspect. For details, refer to detailed descriptions in the method embodiments. Details are not described herein again.

According to a ninth aspect, this application provides a computer-readable storage medium, where the computer-readable storage medium stores a computer instruction, and when the instruction is run on a computer, the computer is enabled to perform functions performed by the first network device in the first aspect or the second aspect.

According to a tenth aspect, this application provides a computer-readable storage medium, where the computer-readable storage medium stores a computer instruction, and when the instruction is run on a computer, the computer is enabled to perform functions performed by the second network device in any one of the first aspect or the possible implementations of the first aspect.

DESCRIPTION OF EMBODIMENTS

To make objectives, technical solutions, and advantages of this application clearer, the following further describes this application in detail with reference to accompanying drawings.

With development of a wireless communications technology, service types and service requirements of a user are increasingly varied. To ensure different service requirements of different users for different service types, different PCC rules and QoS rules may be executed for different terminals. If a PCC architecture includes a BBERF, a PCRF sends a QoS rule that is made for a terminal to the BBERF, so that the BBERF controls QoS of a user; and the PCRF sends a PCC rule that is made for the terminal to a PCEF, so that the PCEF performs a PCC function. If the PCC architecture does not include the BBERF, the PCRF sends the PCC rule to the PCEF by using a policy and charging control rule installing and/or removing request.

However, if the terminal falls back to a 2G network due to a call or the terminal is in a suspended state due to another reason, in this case, the terminal cannot receive downlink data, and therefore a service data flow (SDF) or a quality of service flow (QoS flow) between a network device and the terminal cannot be updated. Therefore, when the terminal is in a suspended state, if the PCRF sends the request for updating the PCC rule and/or the QoS rule to the PCEF and/or the BBERF, the PCEF and/or the BBERF cannot perform an update operation, and return/returns an update failure response to the PCRF. After receiving the update failure response, the PCRF redelivers an update request until update succeeds. Consequently, signaling interaction is frequent, and signaling resources are wasted.

To resolve the foregoing problem, an embodiment of this application provides a rule management method, to resolve a problem that when a terminal is suspended and there is a request for updating a PCC rule and/or a QoS rule, signaling interaction is frequent, and resources are wasted.

The rule management method provided in this embodiment of this application may be applied to long term evolution (LTE), 5G, or future other communications systems. This is not limited in this application. For example, in LTE, this embodiment of this application may be performed by a BBERF (S-GW), a PCEF (P-GW), and a PCRF. If a PCC architecture does not include the BBERF, this embodiment of this application is mainly performed by the PCEF (P-GW) and the PCRF. For another example, in 5G, this embodiment of this application may be performed by a policy control function (PCF) and a session management function (SMF). Specifically, in this embodiment of this application, a first network device may be the SMF, and a second network device may be the PCF.

Figure 1:
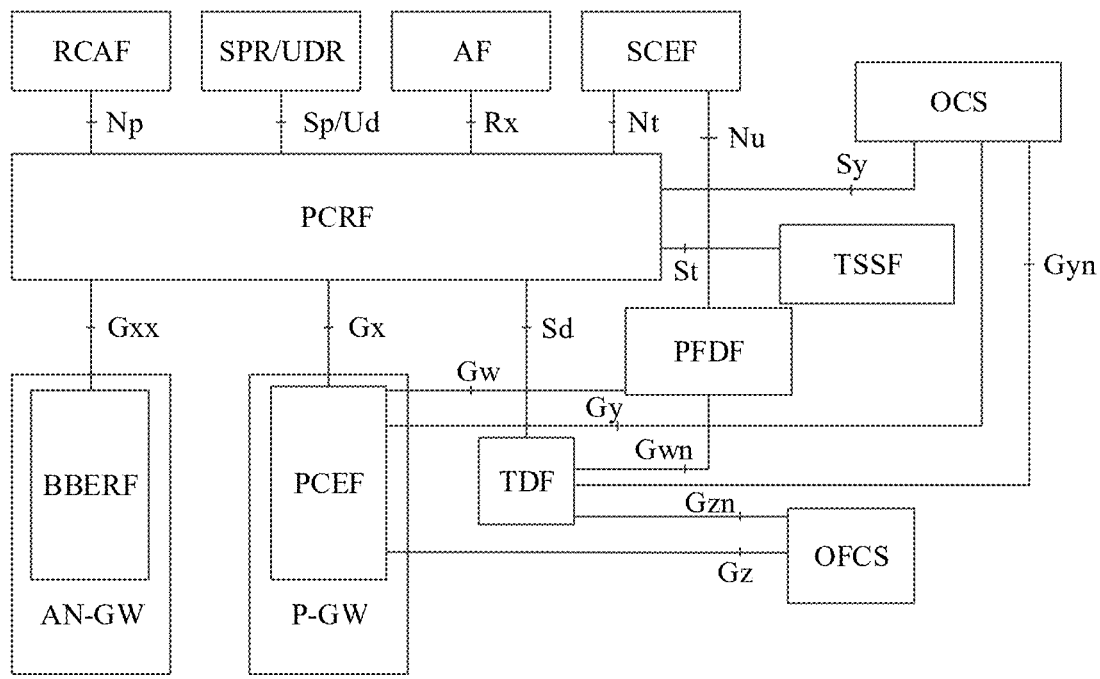
FIG. 1 is a schematic diagram of a PCC architecture according to an embodiment of this application.
Figure 2:
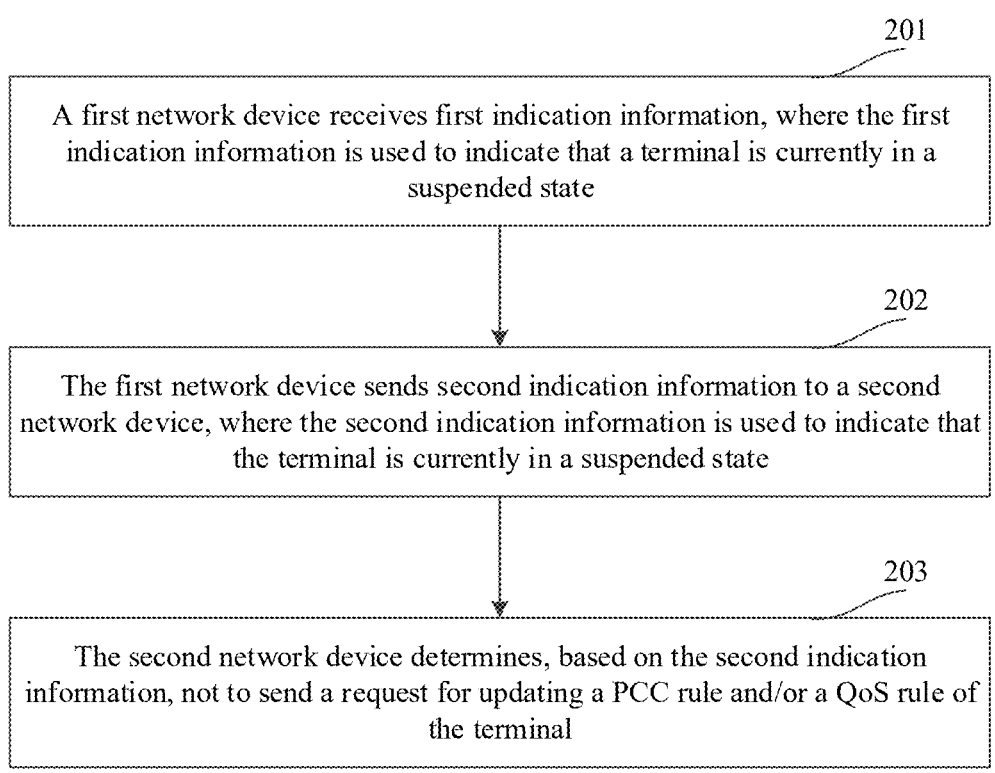
FIG. 2 is a schematic flowchart of a rule management method according to an embodiment of this application.

FIG. 2 is a schematic flowchart of a rule management method according to an embodiment of this application. As shown in FIG. 2, the method may include the following steps.

Step 201: A first network device receives first indication information, where the first indication information is used to indicate that a terminal is in a suspended state.

Step 202: The first network device sends second indication information to a second network device, where the second indication information is used to indicate that the terminal is in a suspended state.

Specifically, after receiving the first indication information, the first network device may immediately report a status of the terminal to the second network device based on an indication of the second network device. Alternatively, the first network device may send the second indication information to the second network device after receiving a request that is used for updating a PCC rule and/or a QoS rule and that is sent by the second network device. A detailed description is given below.

Step 203: The second network device determines, based on the second indication information, not to send a request for updating a PCC rule and/or a QoS rule of the terminal.

Figure 3:
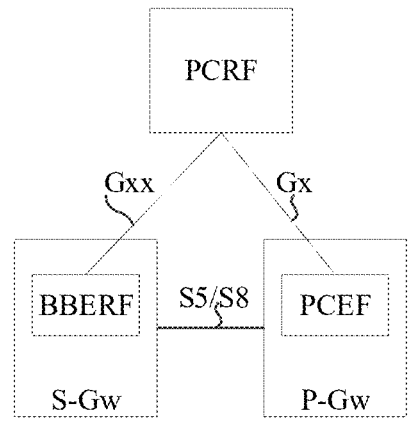
FIG. 3 shows a PCC architecture that includes a BBERF according to an embodiment of this application.

An LTE communications system is used as an example. When a PCC architecture includes a BBERF, as shown in FIG. 3, when the terminal is suspended, an MME sends indication information to an S-GW (the BBERF is disposed in the S-GW, and the BBERF is the first network device) to indicate that the terminal is in a suspended state. The BBERF may send indication information to a PCRF (the second network device), to indicate that the terminal is in a suspended state. After the PCRF receives the indication information sent by the BBERF, even if there is a current need to update the PCC rule and/or the QoS rule of the terminal, the PCRF temporarily does not send a request for updating the QoS rule of the terminal to the BBERF, and does not send a request for updating the PCC rule of the terminal to the PCEF.

Figure 4:
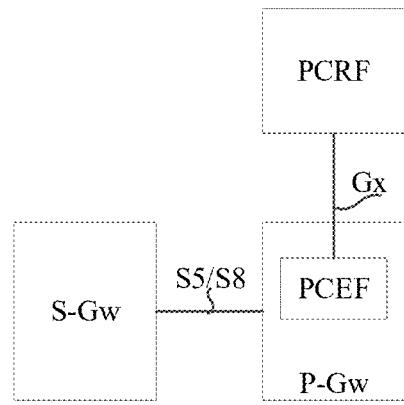
FIG. 4 shows a PCC architecture that does not include a BBERF according to an embodiment of this application.

When the PCC architecture does not include the BBERF, as shown in FIG. 4, when the terminal is suspended, the MME sends indication information to the S-GW, and the S-GW further sends indication information to a P-GW (the PCEF is disposed in the P-GW, and the PCEF is the first network device), to indicate that the terminal is in a suspended state. The PCEF may send indication information to the PCRF (the second network device), to indicate that the terminal is in a suspended state. After the PCRF receives the indication information sent by the PCEF, even if there is a current need to update the PCC rule of the terminal, the PCRF temporarily does not send a request for updating the PCC rule to the PCEF.

In the foregoing method, because the first network device sends the information indicating that the terminal is in a suspended state to the second network device, the second network device determines temporarily not to send the request for updating the PCC rule and/or the QoS rule of the terminal, to avoid a case in which the second network device constantly sends an update request, and the first network device constantly replies with an update failure response, thereby reducing signaling interaction between the first network device and the second network device, and helping improve resource utilization.

Further, after the foregoing step 203, if the first network device receives third indication information indicating status resumption of the terminal, the first network device may send fourth indication information to the second network device, to indicate that the terminal resumes to a normal state. After receiving the fourth indication information, and when determining that there is a need to update the PCC rule and/or the QoS rule of the terminal, the second network device may send a request for updating the PCC rule and/or the QoS rule of the terminal. For example, if the first network device is the BBERF, when determining that there is a need to update the PCC rule and the QoS rule of the terminal, the PCRF (the second network device) sends a request for updating the QoS rule of the terminal to the BBERF, and further sends a request for updating the PCC rule of the terminal to the PCEF; if the first network device is the PCEF, after the PCRF (the second network device) determines that there is a need to update the PCC rule of the terminal, the PCRF sends a request for updating the PCC rule of the terminal to the PCEF.

In a possible implementation, after receiving a first request (namely, a request for updating the PCC rule or the QoS rule of the terminal) sent by the second network device, the first network device may determine, based on the first indication information, that the terminal is in a suspended state, and therefore send second indication information to the second network device, to notify the second network device that the terminal is in a suspended state. For example, the PCRF sends a request for updating the QoS rule to the BBERF, because the BBERF determines, based on indication information sent by the MME, that the terminal is in a suspended state, the BBERF returns an update failure response to the PCRF, and at a same time, the response includes a reason why update fails, and the reason is that the terminal is in a suspended state, that is, the response includes the second indication information. For another example, the PCRF sends a request for updating the PCC rule to the PCEF, because the PCEF determines, based on indication information sent by the S-GW, that the terminal is in a suspended state, the PCEF returns an update failure response to the PCRF, and at a same time, the response includes a reason why update fails, and the reason is that the terminal is in a suspended state, that is, the response includes the second indication information. When learning that update of the PCC rule or the QoS rule fails because the terminal is in a suspended state, the PCRF determines temporarily not to send a request for updating the QoS rule and/or the PCC rule to the BBERF and/or the PCEF, to avoid waste of signaling resources caused by unnecessary signaling interaction.

In some embodiments, the first request may be further used to request subscription to information indicating that the terminal resumes to a normal state from a suspended state. Correspondingly, after the first network device receives the first request, and if it is determined that the terminal is in a normal state, the first network device updates the PCC rule and/or the QoS rule of the terminal based on the first request. If the first network device determines that the terminal is in a suspended state, the first network device returns a response message to the second network device, where the response message indicates that the second network device has an update failure, and a failure reason is that the terminal is in a suspended state. In addition, if the first network device receives third indication information indicating that the terminal resumes to a normal state, because the first request is used to subscribe to an event in which the terminal resumes to a normal state from a suspended state, the first network device reports information indicating that the terminal resumes to a normal state from a suspended state to the second network device. In other words, the first network device sends fourth indication information to the second network device, where the fourth indication information is used to indicate that the terminal resumes to a normal state. After receiving the fourth indication information, the second network device may send a request for updating the PCC rule or the QoS rule of the terminal again to the first network device.

The foregoing embodiment helps the second network device immediately obtain the information indicating that the terminal has returned to a normal state, and further helps the second network device immediately send, after the terminal resumes to a normal state, a request for updating the PCC rule or the QoS rule of the terminal, thereby ensuring time effectiveness of policy and charging control and service requirement control of the terminal.

In some other embodiments, the first request may be further used to request subscription to status information of the terminal. Correspondingly, after the first network device receives the first request, if it is determined that the terminal is in a normal state, the first network device updates the PCC rule and/or the QoS rule of the terminal based on the first request: if the first network device determines that the terminal is in a suspended state, the first network device returns a response message to the second network device, where the response message indicates an update failure, and indicates that the terminal is in a suspended state. In addition, if the first network device subsequently receives indication information indicating a status of the terminal, the first network device reports status information of the terminal to the second network device. For example, after subsequently receiving indication information indicating that the terminal resumes to a normal state, the first network device reports information indicating that the terminal resumes to a normal state to the second network device; and then after receiving indication information indicating that the terminal is suspended, the first network device actively reports information indicating that the terminal is in a suspended state to the second network device.

Optionally, when requesting subscription to status information of the terminal, the second network device may request subscription to status information indicating that the terminal is in a suspended state or that the terminal recovers from a suspended state; or may request subscription to information indicating a status change of the terminal. Specifically, after receiving information indicating that a status of the terminal changes, the first network device reports the status change of the terminal to the second network device, and further reports status information obtained after the change to the second network device.

In the foregoing embodiment, because the first network device reports status information indicating that the terminal is suspended or that the terminal resumes to a normal state to the second network device, a case in which when the terminal is suspended, the second network device sends a request for updating the rule is avoided. Because the request for updating the rule usually occupies more resources than signaling for reporting status information of the terminal, this embodiment helps improve resource utilization.

In addition, the second network device may request subscription to status information of the terminal during establishment or modification of a session between the terminal and a network device. For example, after the terminal accesses the network device, and an IP-CAN session is established between the terminal and the network device, the PCRF sends a request for installing the QoS rule to the BBERF, where the request carries an event in which subscription to a status change of the terminal is requested. If the PCC architecture does not include the BBERF, after the terminal accesses the network device and an IP-CAN session is established between the terminal and the network device, when the PCRF sends a request for installing the PCC rule to the PCEF, the terminal is suspended, and the terminal resumes to a normal state, the PCRF may further request the PCEF to report a status change event of the terminal to the PCRF: or when the terminal resumes to a normal state from a suspended state, the PCRF may only request the PCEF to report status information of the terminal.

In another possible implementation, alternatively, the second network device may send a second request to the first network device, where the request is used to request subscription to status information of the terminal. Correspondingly, after the first network device receives the second request, if the first network device receives first indication information indicating that the terminal is in a suspended state, or the first network device receives third indication information indicating that the terminal resumes to a normal state, the first network device immediately reports status information of the terminal to the second network device. The foregoing embodiment can avoid a case in which when the terminal is suspended, the second network device sends the request for updating the rule thereby helping avoid waste of signaling resources. Specifically, the second request may be used to request subscription to status information of the terminal. Alternatively, the second request may be used to request subscription to information indicating that the terminal recovers from a suspended state.

When the PCC architecture is shown in FIG. 3, in other words, the BBERF is disposed in the S-GW, after receiving status information of the terminal that is sent by the MME, the S-GW does not send the status information of the terminal to the P-GW, and therefore the PCEF cannot obtain current status information of the terminal. Therefore, if the terminal is in a suspended state, and the PCRF sends a request for updating the QoS rule of the terminal to the BBERF and sends a request for updating the PCC rule of the terminal to the PCEF, because the BBERF cannot update an SDF between the terminal and the BBERF, the BBERF cannot update the QoS rule of the terminal; however, the PCEF does not know information about a current status of the terminal, and the PCEF does not need to interact with the terminal when updating the PCC rule of the terminal, the PCEF updates the PCC rule of the terminal, and consequently update of the PCC rule is inconsistent with update of the QoS rule. In other words, quality of service provided for the terminal is inconsistent with a charging rule of the terminal.

To avoid the foregoing case, the second network device (the PCRF) may send indication information to the PCEF after receiving the first indication information that indicates that the terminal is in a suspended state and that is sent by the first network device (the BBERF), so that the PCEF can obtain information indicating that the terminal is in a suspended state, and when the PCEF has downlink data of the terminal, the PCEF delays sending the downlink data to the S-GW.

Further, the second network device (PCRF) may send indication information to the PCEF when receiving the third indication information that indicates that the terminal has returned to a normal state and that is sent by the first network device (the BBERF), so that the PCEF can obtain information indicating that the terminal has returned to a normal state, and the PCEF may send downlink data of the terminal to the S-GW.

Optionally, the second network device (PCRF) may determine, based on a requirement of the PCEF, whether to send status information of the terminal to the PCEF. For example, the PCEF may send a third request to the PCRF, where the third request is used to request subscription to information indicating a status of the terminal; after receiving the third request, if the PCRF receives the first indication information that indicates that the terminal is in a suspended state and that is sent by the BBERF, or receives the third indication information that indicates that the terminal resumes to a normal state and that is sent by the BBERF, the PCRF sends status information of the terminal to the PCEF. Further, when the terminal is suspended, and the terminal resumes to a normal state, the third request may be used to request the PCRF to send the status information of the terminal to the PCEF; alternatively, when the terminal resumes to a normal state from a suspended state, the third request may be used only to request the PCRF to send information indicating that the terminal resumes to a normal state to the PCEF.

To clearly understand the rule management method provided in the foregoing embodiment, the following further describes the rule management method by using examples in FIG. 5 to FIG. 14.

Credit control (CC) or re-authorization (RA) signaling includes an event-trigger (Event-Trigger attribute-value pair (AVP)) field. The field includes a reserved value (value). In the embodiments of this application, the reserved value may be used to indicate that the PCRF requests subscription to status information of the terminal, or requests subscription to information indicating that the terminal resumes to a normal state from a suspended state, or the like. For example, if a value of an event-trigger AVP field in CCA or RAR signaling sent by the PCRF is 56, it indicates that the PCRF requests subscription to status information of the terminal, and the BBERF or the PCEF reports a current status of the terminal to the PCRF when a status of the terminal changes, if a value of the event-trigger AVP field is 57, it indicates that the PCRF requests subscription to information indicating that the terminal resumes to a normal state from a suspended state. It should be understood that the value of the field is merely used as an example, and does not constitute a limitation to this application.

Figure 5:
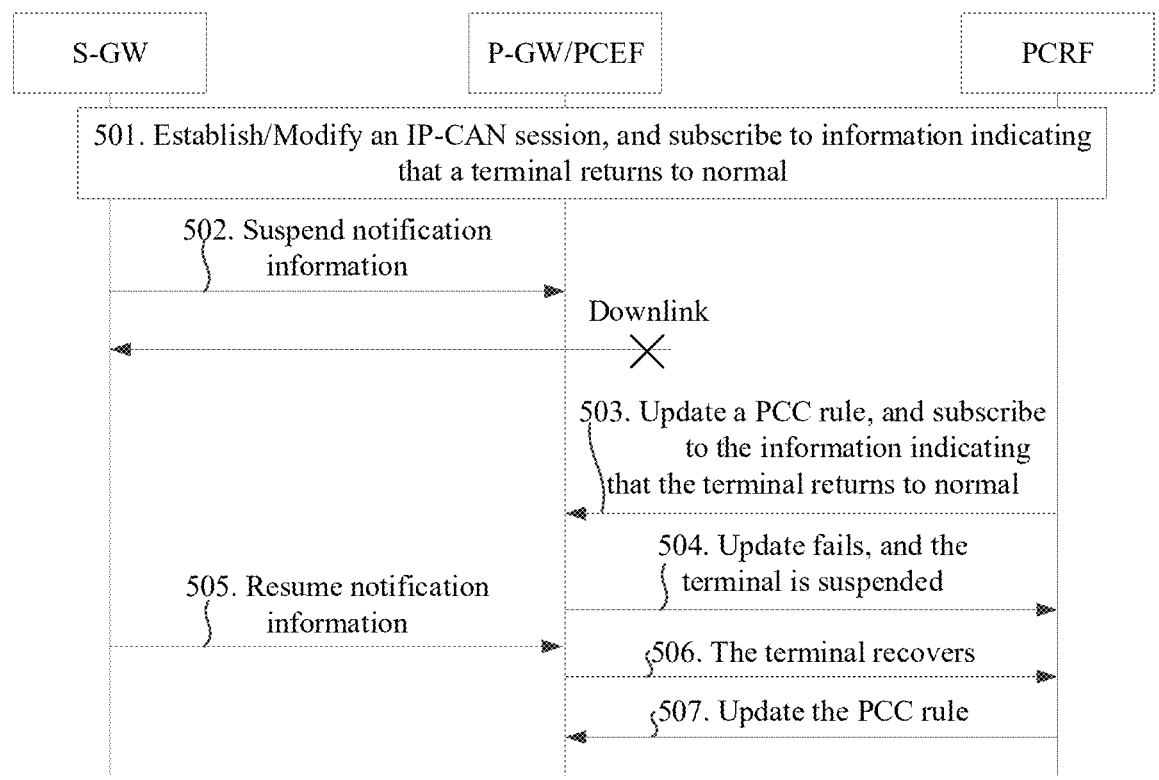
FIG. 5 is a schematic diagram of a rule management method according to an embodiment of this application.

FIG. 5 is a schematic flowchart of a rule management method in a case in which a PCC architecture does not include a BBERF.

Step 501: An S-GW, a P-GW, and a PCRF are triggered to create or modify an IP-CAN session of a terminal.

Specifically, when the IP-CAN session is created or modified, the PCRF sends, by using CCA or RAR signaling, a request for installing or updating a PCC rule to a PCEF.

Further, the signaling sent by the PCRF to the PCEF may further carry an event-trigger AVP field. A value of the field indicates requesting subscription to information indicating that the terminal resumes to a normal state from a suspended state.

Step 502: The terminal is suspended, and the S-GW sends suspend notification information to the P-GW (the PCEF is disposed in the P-GW).

Because the PCRF subscribes to only the information indicating that the terminal resumes to a normal state from a suspended state, the PCEF does not report information indicating that the terminal is suspended.

Step 503: The PCRF is triggered to update the PCC rule of the terminal, and sends RAR signaling to the PCEF, where the signaling includes a policy and charging control rule installing and/or removing request (Charging-Rule-Install AVP and/or Charging-Rule-Remove AVP), and the request is used to request to update the PCC rule.

Optionally, the signaling may further include an event-trigger AVP field, and a value of the field indicates requesting subscription to the information indicating that the terminal resumes to a normal state from a suspended state.

Step 504: The PCEF determines that the terminal is still in a suspended state, and replies to the PCRF with RAA signaling, where the signaling carries indication information indicating that update of the rule fails and a failure reason is that the terminal is in a suspended state.

After receiving the signaling, the PCRF determines that the PCEF fails to update the rule, and temporarily does not send a request for updating the rule.

Step 505: After the terminal resumes to a normal state from a suspended state, the S-GW sends a modify bearer request or resume notification information to the P-GW.

Step 506: The PCEF sends CCR signaling to the PCRF, where the signaling carries an event-trigger AVP field, and a value of the field indicates status resumption of the terminal.

Step 507: The PCRF sends CCA signaling to the PCEF, where the signaling includes a rule installing and/or removing command request, and the request is used to request to update the PCC rule.

Figure 6:
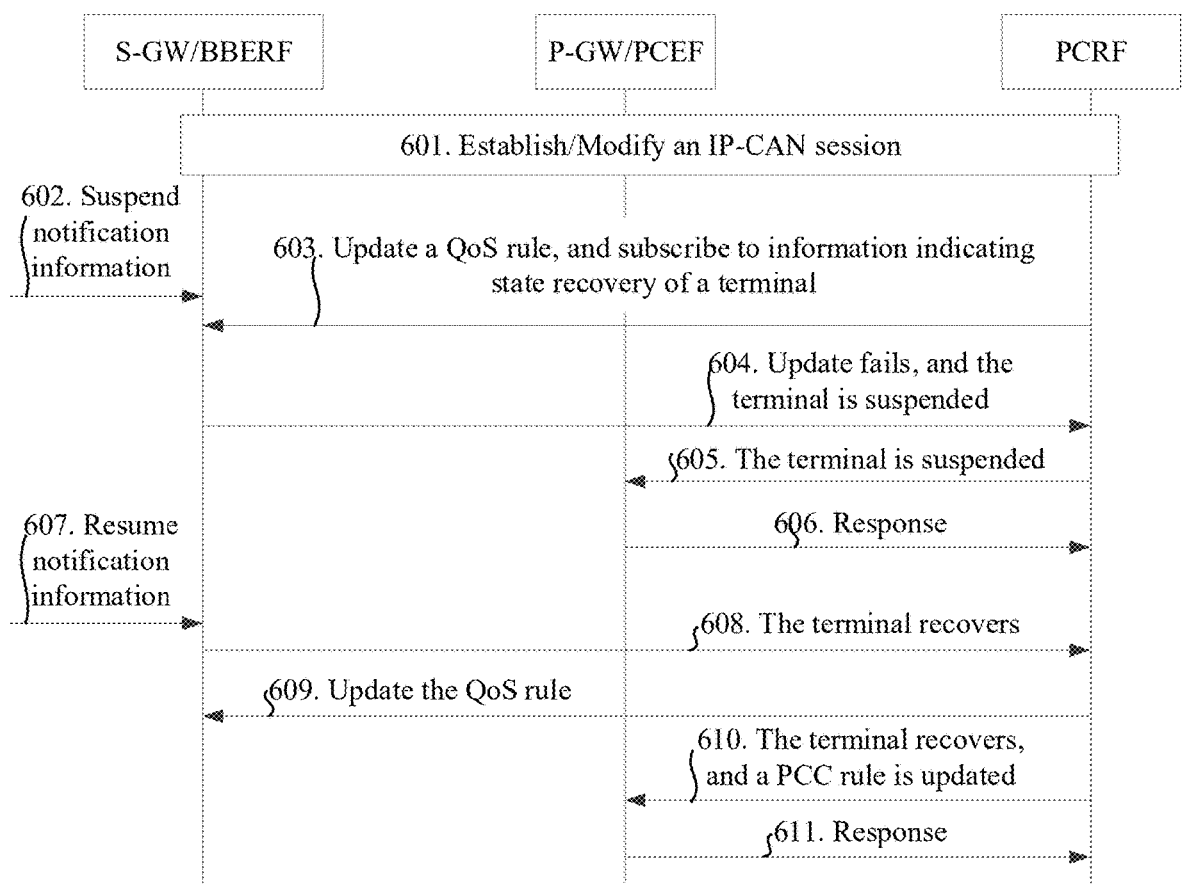
FIG. 6 is a schematic diagram of a rule management method according to an embodiment of this application.

FIG. 6 is a schematic flowchart of a rule management method in a case in which a PCC architecture includes a BBERF, where:

Step 601: An S-GW, a P-GW, and a PCRF are triggered to create or modify an IP-CAN session of a terminal.

Specifically, when the IP-CAN session is created or modified, the PCRF sends, by using CCA or RAR signaling, a request for installing or updating a QoS rule to the BBERF, and the PCRF sends, by using CCA or RAR signaling, a request for installing or updating a PCC rule to a PCEF. Further, the signaling sent by the PCRF to the BBERF may further carry an event-trigger AVP, where a value of the field indicates requesting subscription to information indicating that the terminal recovers from a suspended state, so that when the terminal recovers from a suspended state, the BBERF sends the information indicating that the terminal recovers from a suspended state to the PCRF; alternatively, the PCRF may send, by using other signaling, a request for subscribing to the information indicating that the terminal recovers from a suspended state.

Step 602: The terminal is suspended, and an MME sends suspend notification information to the S-GW (the BBERF is disposed in the S-GW).

Step 603: The PCRF is triggered to update a PCC rule and a QoS rule of the terminal, and the PCRF sends RAR signaling to the BBERF, where the signaling carries a quality of service rule installing and/or removing request (QoS-Rule-Install AVP and/or QoS-Rule-Remove AVP), that is, used to request the BBERF to update the QoS rule.

Optionally, the signaling may further include an event-trigger AVP field, and a value of the field indicates requesting subscription to status information of the terminal.

Step 604: The BBERF sends RAA signaling to the PCRF, where the signaling carries indication information indicating that update of the rule fails and a failure reason is that the terminal is in a suspended state.

After receiving the signaling, the PCRF determines that the PCEF fails to update the rule, but temporarily does not send a request for updating the rule (including a request for updating the QoS rule and the PCC rule), and stores status information of the terminal.

Step 605: After the terminal resumes to a normal state, the MME sends a modify bearer request or resume notification information to the S-GW.

Step 606: The BBERF sends CCR signaling to the PCRF, where the signaling carries an event-trigger AVP field, and a value of the field indicates that the terminal has returned to a normal state.

Step 607: The PCRF sends CCA signaling to the BBERF, where the signaling carries a quality of service rule installing and/or removing request (QoS-Rule-Install AVP and/or QoS-Rule-Remove AVP).

Step 608: The PCRF sends RAR signaling to the PCEF, where the signaling carries an event-trigger AVP field, and a value of the field indicates that the terminal resumes to a normal state; and the signaling further includes a policy and charging control rule installing and/or removing request, and the request is used to request the PCEF to update the PCC rule.

Step 609: The PCEF returns a response message to the PCRF. Step 610: The terminal recovers, and a PCC rule is updated. Step 611: P-GW/PCEF sends a response to PCRF.

In the foregoing embodiment, step 607 and step 608 are sequentially interchangeable.

Figure 7:
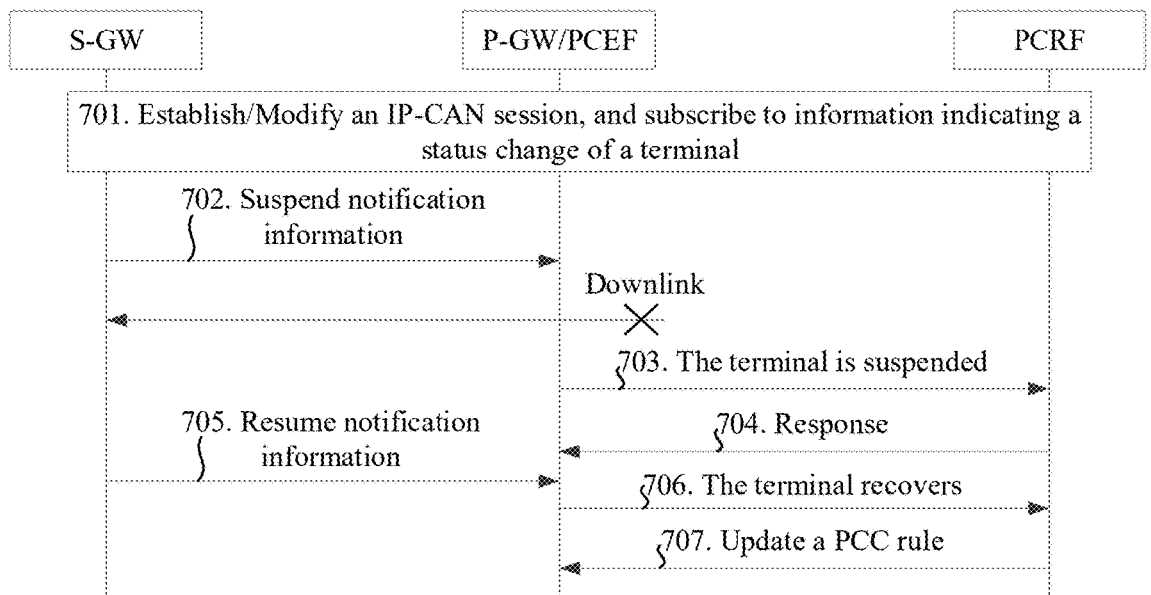
FIG. 7 is a schematic diagram of a rule management method according to an embodiment of this application.

FIG. 7 is a schematic flowchart of a rule management method in a case in which a PCC architecture does not include a BBERF, where:

Step 701: An S-GW, a P-GW, and a PCRF are triggered to create or modify an IP-CAN session of a terminal.

Specifically, when the IP-CAN session is created or modified, the PCRF sends, by using CCA or RAR signaling, a request for installing or updating a PCC rule to a PCEF.

A value of an event-trigger AVP field in the CCA or RAR signaling indicates requesting subscription to information indicating a status change of the terminal, so that when a status of the terminal changes, the PCEF sends status information of the terminal to the PCRF.

Step 702: The terminal is suspended, and the S-GW sends suspend notification information to the P-GW.

Step 703: The PCEF sends CCR or RAA signaling to the PCRF, where the signaling carries an event-trigger AVP field, and a value of the field indicates that a status of the terminal changes: and the signaling further includes a user-_status AVP field, and a value of the field indicates that the terminal is in a suspended state.

Step 704: The PCRF stores status information of the terminal, determines temporarily not to send a request for updating the PCC rule to the PCEF, and replies to the PCEF with response information.

Step 705: After the terminal resumes to a normal state from a suspended state, the S-GW sends a modify bearer request or resume notification information to the P-GW.

Step 706: The PCEF sends CCR or RAA signaling to the PCRF, where the signaling carries an event-trigger AVP field, and a value of the field indicates that a status of the terminal changes; and the signaling further includes a user_ status AVP field, and a value of the field indicates that the terminal resumes to a normal state.

Step 707: The PCRF is triggered to update the PCC rule of the terminal, and sends a policy and charging control rule installing and/or removing request to the PCEF, and the request is used to request to update the PCC rule.

Figure 8:
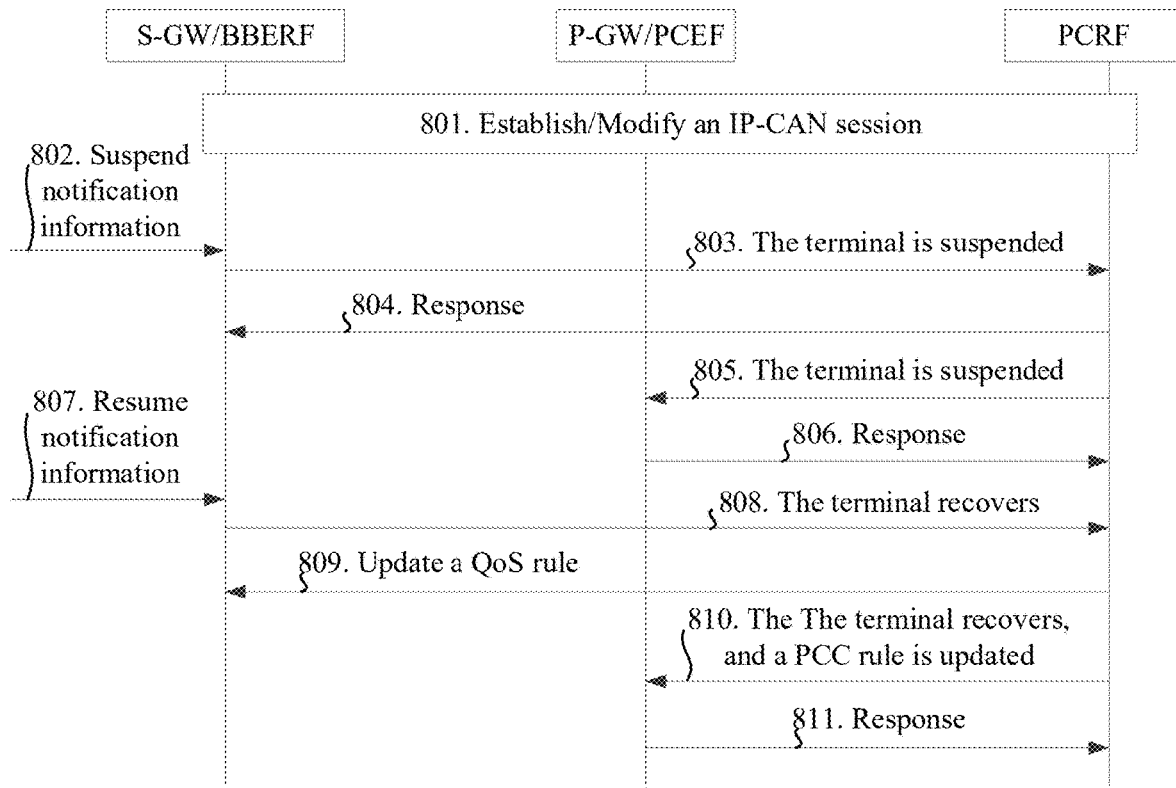
FIG. 8 is a schematic diagram of a rule management method according to an embodiment of this application.

FIG. 8 is a schematic flowchart of a rule management method in a case in which a PCC architecture includes a BBERF, where:

Step 801: An S-GW, a P-GW, and a PCRF are triggered to create or modify an IP-CAN session of a terminal.

Specifically, when the IP-CAN session is created or modified, the PCEF may send CCR or RAA signaling to the PCRF, where the signaling carries an event-trigger AVP field, and a value of the field indicates requesting subscription to information indicating a status change of the terminal, so that when a status of the terminal changes, the PCRF sends status information of the terminal to the PCEF. The PCRF sends, by using CCA or RAR signaling, a request for installing or updating a QoS rule to the BBERF, and the PCRF sends, by using CCA or RAR signaling, a request for installing or updating a PCC rule to the PCEF. Further, the signaling sent by the PCRF to the BBERF may further carry an event-trigger AVP, and a value of the field indicates requesting subscription to information indicating a status change of the terminal, so that when a status of the terminal changes, the BBERF sends status information of the terminal to the PCRF: or the PCRF may send, by using other signaling, a request for subscribing to status information of the terminal.

Step 802: The terminal is suspended, and an MME sends suspend notification information to the S-GW.

Step 803: The BBERF sends CCR signaling to the PCRF, where the signaling carries an event-trigger AVP field, and a value of the field indicates that a status of the terminal changes; and the signaling further includes a user_status AVP field, and a value of the field indicates that the terminal is in a suspended state.

Step 804: The PCRF stores status information of the terminal, determines temporarily not to send a request for updating the QoS rule to the BBERF, and not to send a request for updating the PCC rule to the PCEF, and replies to the BBERF with response information.

Step 805: The PCRF sends RAR signaling to the PCEF, where the signaling carries an event-trigger AVP field, and a value of the field indicates that a status of the terminal changes; and the signaling further includes a user_status AVP field, and a value of the field indicates that the terminal is in a suspended state.

Step 806: After receiving the signaling, the PCEF no longer sends downlink data of the terminal to the BBERF, and replies to the PCRF with response information.

Step 807: After the terminal resumes to a normal state, the MME sends a modify bearer request or resume notification information to the S-GW.

Step 808: The BBERF sends CCR signaling to the PCRF, where the signaling carries an event-trigger AVP field, and a value of the field indicates that a status of the terminal changes: and the signaling further includes a user_status AVP field, and a value of the field indicates that the terminal resumes to a normal state.

Step 809: The PCRF sends a quality of service rule installing and/or removing request (QoS-Rule-Install AVP and/or QoS-Rule-Remove AVP) to the BBERF.

Step 810: The PCRF sends RAR signaling to the PCEF, where the signaling includes an event-trigger AVP field, and a value of the field indicates that a status of the terminal changes; the signaling further includes a user_status AVP field, and a value of the field indicates that the terminal resumes to a normal state; and the signaling further includes a policy and charging control rule installing and/or removing request, and the request is used to request the PCEF to update the PCC rule.

Step 811: The PCEF determines that the PCEF may send downlink data of the terminal to the BBERF, and return response information to the PCRF.

In the foregoing embodiment, step 804 and step 805 may be sequentially interchangeable.

Figure 9:
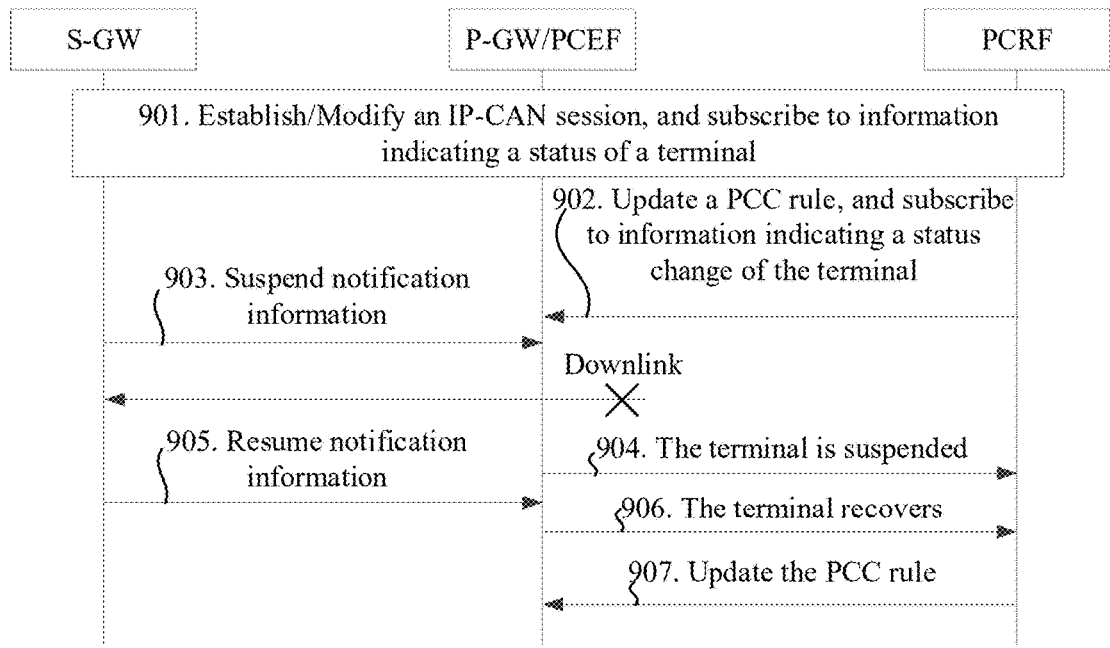
FIG. 9 is a schematic diagram of a rule management method according to an embodiment of this application.

FIG. 9 is a schematic flowchart of a rule management method in a case in which a PCC architecture does not include a BBERF, where:

Step 901: An S-GW, a P-GW, and a PCRF are triggered to create or modify an IP-CAN session of a terminal.

Specifically, when the IP-CAN session is created or modified, the PCRF sends, by using CCA or RAR signaling, a request for installing or updating a PCC rule to a PCEF.

A value of an event-trigger AVP field in the CCA or RAR signaling indicates requesting subscription to status information of the terminal, so that when a status of the terminal changes, the PCEF sends status information of the terminal to the PCRF.

Step 902: The PCRF is triggered to update the PCC rule of the terminal, and sends RAR signaling to the PCEF, where the signaling includes a policy and charging control rule installing and/or removing request, and the request is used to request to update the PCC rule.

Optionally, the signaling may further include an event-trigger AVP field, and a value of the field indicates requesting subscription to status information of the terminal, so that when a status of the terminal changes, the PCEF sends status information of the terminal to the PCRF.

Step 903: The terminal is suspended, and the S-GW sends suspend notification information to the P-GW.

Step 904: The PCEF sends RAA signaling to the PCRF, where the signaling carries an event-trigger AVP field, and a value of the field indicates that a status of the terminal changes; and the signaling further includes a user_status AVP field, and a value of the field indicates that the terminal is in a suspended state.

The PCRF stores status information of the terminal, and determines temporarily not to send a request for updating the PCC rule to the PCEF.

Step 905: After the terminal resumes to a normal state, the S-GW sends a modify bearer request or resume notification information to the P-GW.

Step 906: The PCEF sends CCR signaling to the PCRF, where the signaling carries an event-trigger AVP field, and a value of the field indicates that a status of the terminal changes; and the signaling further includes a user_status AVP field, and a value of the field indicates that the terminal resumes to a normal state.

Step 907: The PCRF is triggered to update the PCC rule of the terminal, and sends a policy and charging control rule installing and/or removing request to the PCEF, and the request is used to request to update the PCC rule.

In the foregoing embodiment, step 902 and step 903 may be sequentially interchangeable.

Figure 10:
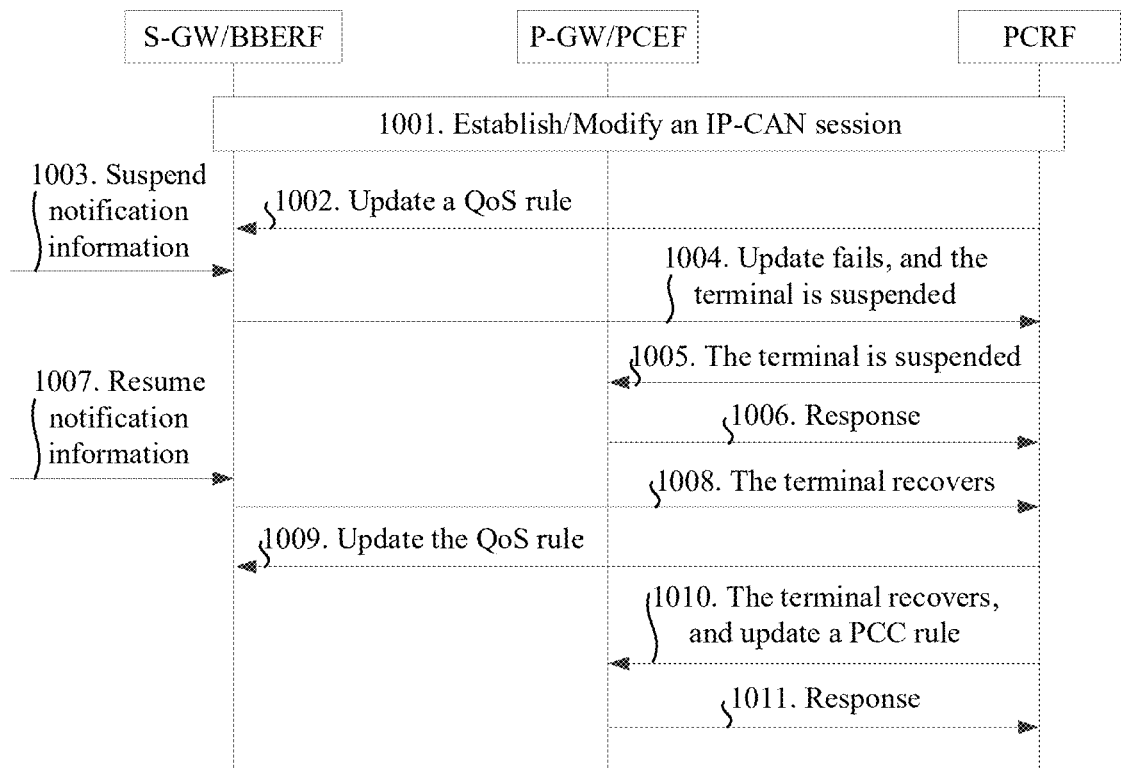
FIG. 10 is a schematic diagram of a rule management method according to an embodiment of this application.

FIG. 10 is a schematic flowchart of a rule management method in a case in which a PCC architecture includes a BBERF, where:

Step 1001: An S-GW, a P-GW, and a PCRF are triggered to create or modify an IP-CAN session of a terminal.

Specifically, when the IP-CAN session is created or modified, the PCEF may send CCR or RAA signaling to the PCRF, where the signaling carries an event-trigger AVP field, and a value of the field indicates requesting subscription to information indicating a status change of the terminal, so that when a status of the terminal changes, the PCRF sends status information of the terminal to the PCEF, the PCRF sends, by using CCA or RAR signaling, a request for installing or updating a QoS rule to the BBERF, and the PCRF sends, by using CCA or RAR signaling, a request for installing or updating a PCC rule to the PCEF. Further, the signaling sent by the PCRF to the BBERF may further carry an event-trigger AVP, and a value of the field indicates requesting subscription to information indicating a status change of the terminal, so that when a status of the terminal changes, the BBERF sends status information of the terminal to the PCRF; or the PCRF may send, by using other signaling, a request for subscribing to status information of the terminal.

Step 1002: The PCRF is triggered to update the PCC rule and the QoS rule of the terminal, and sends RAR signaling to the BBERF, where the signaling carries a quality of service rule installing and/or removing request (QoS-Rule-Install AVP and/or QoS-Rule-Remove AVP).

Step 1003: The terminal is suspended, and an MME sends suspend notification information to the S-GW.

Step 1004: The BBERF sends RAA signaling to the PCRF, where the signaling carries indication information indicating an update failure, and a value of an event-trigger AVP field in the signaling indicates that a status of the terminal changes; and the signaling further includes a user_status AVP field, and a value of the field indicates that the terminal is in a suspended state.

The PCRF stores status information of the terminal, and determines temporarily not to send a request for updating the QoS rule to the BBERF, and not to send a request for updating the PCC rule to the PCEF.

Step 1005: The PCRF sends RAR signaling to the PCEF, where the signaling carries an event-trigger AVP field, and a value of the field indicates that a status of the terminal changes; and the signaling further includes a user_status AVP field, and a value of the field indicates that the terminal is in a suspended state.

Step 1006: After receiving the signaling, the PCEF no longer sends downlink data of the terminal to the BBERF, and replies to the PCRF with response information.

Step 1007: After the terminal resumes to a normal state, the MME sends a modify bearer request or resume notification information to the S-GW.

Step 1008: The BBERF sends CCR signaling to the PCRF, where the signaling carries an event-trigger AVP field, and a value of the field indicates that a status of the terminal changes; and the signaling further includes a user_status AVP field, and a value of the field indicates that the terminal resumes to a normal state.

Step 1009: The PCRF sends CCR signaling to the BBERF, where the signaling includes a quality of service rule installing and/or removing request (QoS-Rule-Install AVP and/or QoS-Rule-Remove AVP).

Step 1010: The PCRF sends RAR signaling to the PCEF, where the signaling includes an event-trigger AVP field, and a value of the field indicates that a status of the terminal changes; the signaling further includes a user_status AVP field, and a value of the field indicates that the terminal resumes to a normal state; and the signaling further includes a policy and charging control rule installing request, and the request is used to request the PCEF to update the PCC rule.

Step 1011: The PCEF determines that the PCEF may send downlink data of the terminal to the BBERF, and return response information to the PCRF.

In the foregoing embodiment, step 1002 and step 1003 may be sequentially interchangeable, step 1004 and step 1005 may be sequentially interchangeable, step 1006 and step 1007 may be sequentially interchangeable, and step 1009 and step 1010 may be sequentially interchangeable.

Figure 11:
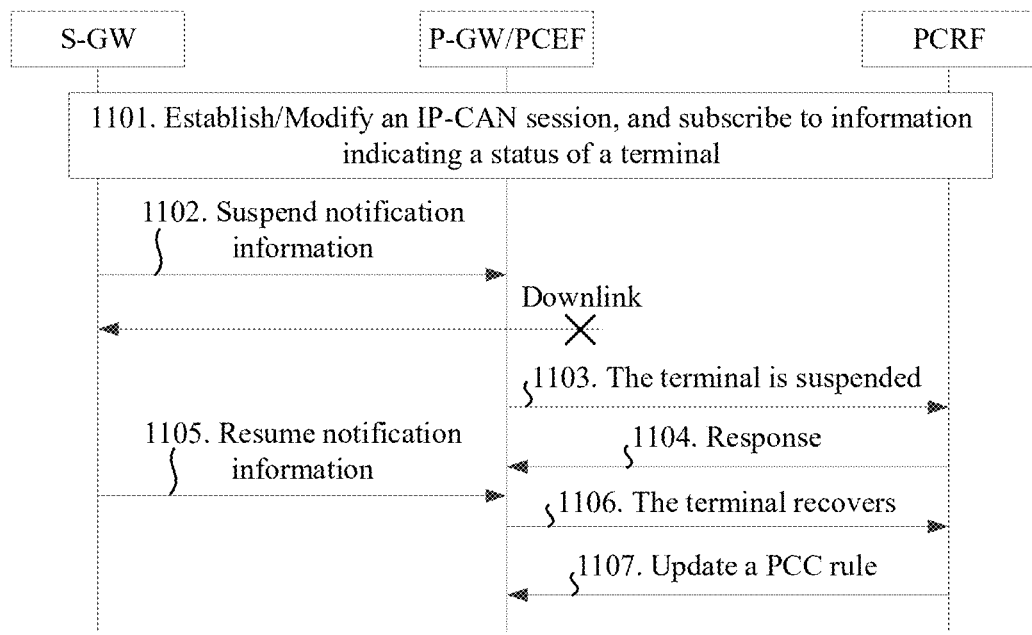
FIG. 11 is a schematic diagram of a rule management method according to an embodiment of this application.

FIG. 11 is a schematic flowchart of a rule management method in a case in which a PCC architecture does not include a BBERF, where:

Step 1101: An S-GW, a P-GW, and a PCRF are triggered to create or modify an IP-CAN session of a terminal.

Specifically, when the IP-CAN session is created or modified, the PCRF sends, by using CCA or RAR signaling, a request for installing or updating a PCC rule to a PCEF.

The CCA or RAR signaling includes two event-trigger AVP fields, where a value of one of the two event-trigger AVP fields indicates requesting subscription to information indicating that the terminal is in a suspended state, and a value of the other event-trigger AVP field indicates requesting subscription to information indicating that the terminal resumes to a normal state from a suspended state, so that when a status of the terminal changes, the PCEF sends status information of the terminal to the PCRF.

Step 1102: The terminal is suspended, and the S-GW sends suspend notification information to the P-GW.

Step 1103: The PCEF sends CCR signaling to the PCRF, where the signaling carries an event-trigger AVP field, and a value of the field indicates that the terminal is in a suspended state.

Step 1104: The PCRF stores status information of the terminal, determines temporarily not to send a request for updating a PCC rule to the PCEF, and replies to the PCEF with response information.

Step 1105: After the terminal resumes to a normal state, the S-GW sends a modify bearer request or resume notification information to the P-GW.

Step 1106: The PCEF sends CCR signaling to the PCRF, where the signaling carries an event-trigger AVP field, and a value of the field indicates that the terminal resumes to a normal state.

Step 1107: The PCRF is triggered to update the PCC rule of the terminal, and sends a policy and charging control rule installing and/or removing request to the PCEF, and the request is used to request to update the PCC rule.

Figure 12:
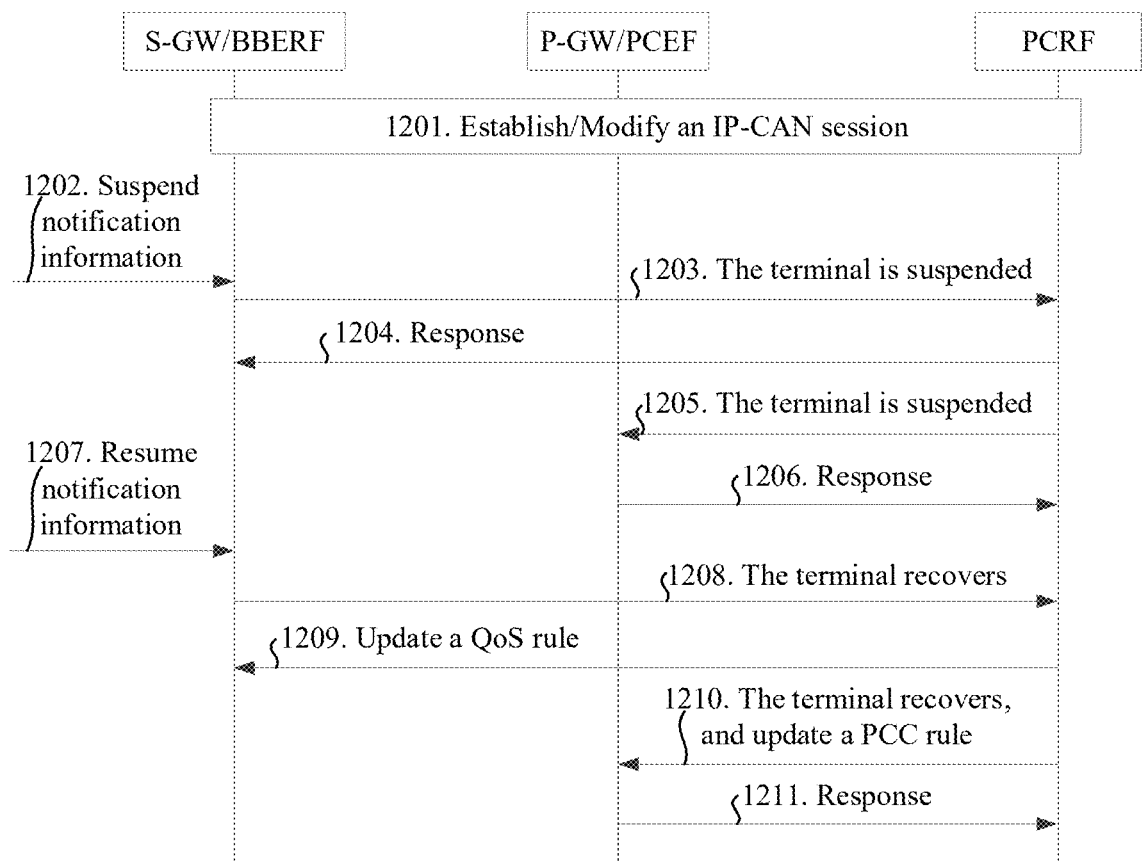
FIG. 12 is a schematic diagram of a rule management method according to an embodiment of this application.

FIG. 12 is a schematic flowchart of a rule management method in a case in which a PCC architecture includes a BBERF, where:

Step 1201: An S-GW, a P-GW, and a PCRF are triggered to create or modify an IP-CAN session of a terminal.

Specifically, when the IP-CAN session is created or modified, the PCEF may send CCR or RAA signaling to the PCRF, where the signaling carries an event-trigger AVP field, and a value of the field indicates requesting subscription to information indicating a status change of the terminal, so that when a status of the terminal changes, the PCRF sends status information of the terminal to the PCEF, the PCRF sends, by using CCA or RAR signaling, a request for installing or updating a QoS rule to the BBERF, and the PCRF sends, by using CCA or RAR signaling, a request for installing or updating a PCC rule to the PCEF. Further, the signaling sent by the PCRF to the BBERF may further carry two event-trigger AVP fields, where a value of one of the two event-trigger AVP fields indicates requesting subscription to an event in which the terminal is in a suspended state, and a value of the other event-trigger AVP field indicates requesting subscription to an event in which the terminal resumes to a normal state from a suspended state, so that when a status of the terminal changes, the BBERF sends status information of the terminal to the PCRF; or the PCRF may send the subscription request by using other signaling.

Step 1202: The terminal is suspended, and an MME sends suspend notification information to the S-GW.

Step 1203: The BBERF sends CCR signaling to the PCRF, where the signaling carries an event-trigger AVP field, and a value of the field indicates that the terminal is in a suspended state.

Step 1204: The PCRF stores status information of the terminal, determines temporarily not to send a request for updating a QoS rule to the BBERF, not to send a request for updating a PCC rule to the PCEF, and replies to the BBERF with response information.

Step 1205: The PCRF sends RAR signaling to the PCEF, where the signaling carries an event-trigger AVP field, and a value of the field indicates that the terminal is in a suspended state.

Step 1206: After receiving the signaling, the PCEF no longer sends downlink data of the terminal to the BBERF, and replies to the PCRF with response information.

Step 1207: After the terminal resumes to a normal state, the MME sends a modify bearer request or resume notification information to the S-GW.

Step 1208: The BBERF sends CCR signaling to the PCRF, where the signaling carries an event-trigger AVP field, and a value of the field indicates that the terminal resumes to a normal state.

Step 1209: The PCRF sends a quality of service rule installing and/or removing request (QoS-Rule-Install AVP and/or QoS-Rule-Remove AVP) to the BBERF.

Step 1210: The PCRF sends RAR signaling to the PCEF, where the signaling includes an event-trigger AVP field, and a value of the field indicates that the terminal resumes to a normal state; and the signaling further includes a policy and charging control rule installing and/or removing request, and the request is used to request the PCEF to update the PCC rule.

Step 1211: The PCEF determines that the PCEF may send downlink data of the terminal to the BBERF, and return response information to the PCRF.

In the foregoing embodiment, step 1204 and step 1205 may be sequentially interchangeable, and step 1209 and step 1210 may be sequentially interchangeable.

Figure 13:
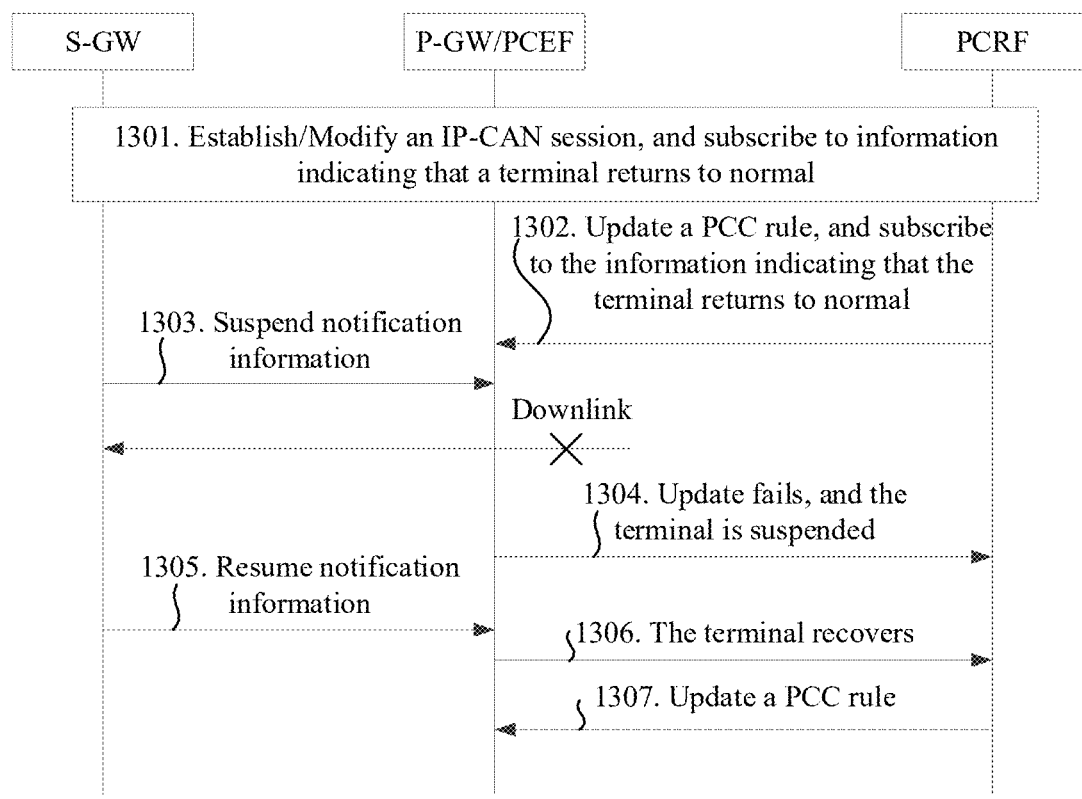
FIG. 13 is a schematic diagram of a rule management method according to an embodiment of this application.

FIG. 13 is a schematic flowchart of a rule management method in a case in which a PCC architecture does not include a BBERF, where:

Step 1301: An S-GW, a P-GW, and a PCRF are triggered to create or modify an IP-CAN session of a terminal.

Specifically, when the IP-CAN session is created or modified, the PCRF sends, by using CCA or RAR signaling, a request for installing or updating a PCC rule to a PCEF.

The CCA or RAR signaling includes two event-trigger AVP fields, where a value of one of the two event-trigger AVP fields indicates requesting subscription to an event in which the terminal is in a suspended state, and a value of the other event-trigger AVP field indicates requesting subscription to an event in which the terminal resumes to a normal state from a suspended state.

Step 1302: The PCRF is triggered to update the PCC rule of the terminal, and sends RAR signaling to the PCEF, where the signaling includes a policy and charging control rule installing and/or removing request, and the request is used to request to update the PCC rule.

Optionally, the signaling may alternatively include two event-trigger AVP fields, where a value of one of the two event-trigger AVP fields indicates requesting subscription to an event in which the terminal is in a suspended state, and a value of the other event-trigger AVP field indicates requesting subscription to an event in which the terminal resumes to a normal state from a suspended state.

Step 1303: The terminal is suspended, and the S-GW sends suspend notification information to the P-GW.

Step 1304: The PCEF sends RAA signaling to the PCRF, where the signaling indicates that update of the rule fails, and a value of an event-trigger AVP field in the signaling indicates that the terminal is in a suspended state.

The PCRF stores status information of the terminal, and determines temporarily not to send a request for updating the PCC rule to the PCEF.

Step 1305 to step 1307 are similar to step 1105 to step 1107, and details are not described herein again.

In the foregoing embodiment, step 1302 and step 1303 may be sequentially interchangeable.

Figure 14:
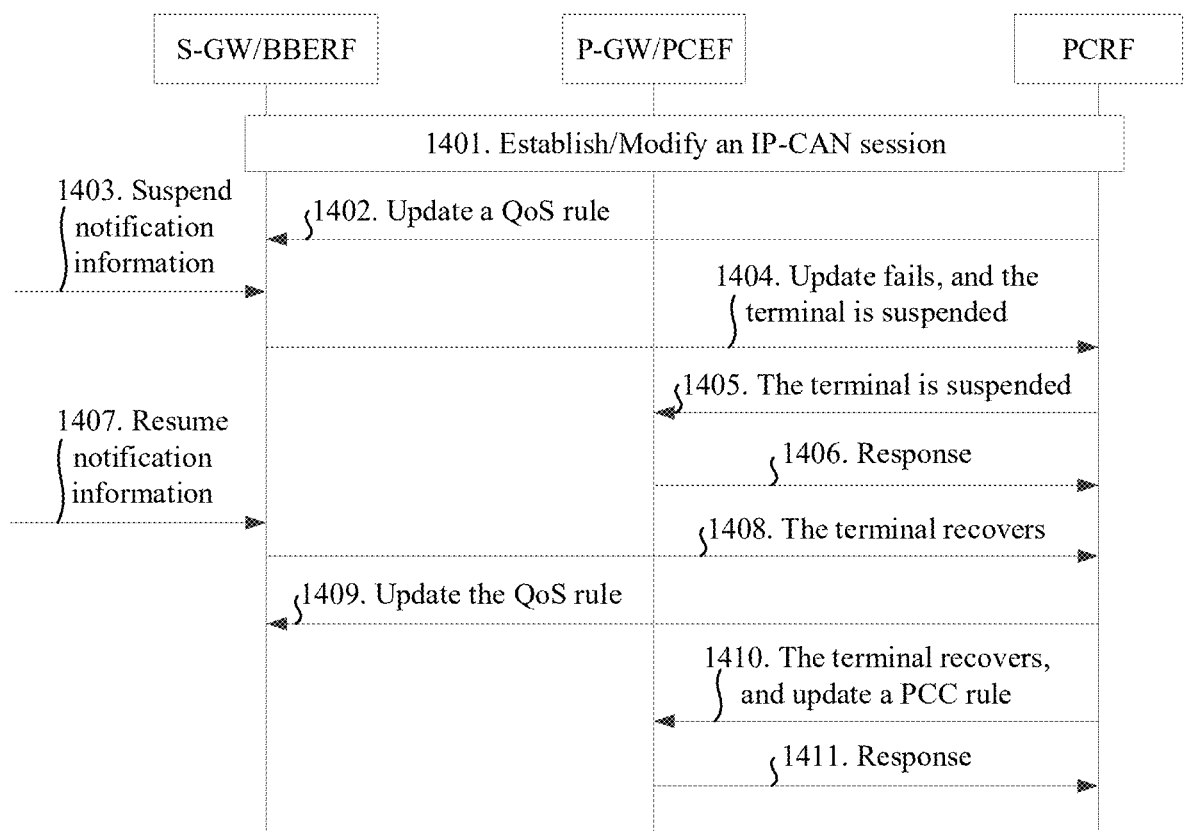
FIG. 14 is a schematic diagram of a rule management method according to an embodiment of this application.

FIG. 14 is a schematic flowchart of a rule management method in a case in which a PCC architecture includes a BBERF, where:

Step 1401: An S-GW, a P-GW, and a PCRF are triggered to create or modify an IP-CAN session of a terminal.

Specifically, when the IP-CAN session is created or modified, the PCEF may send CCR or RAA signaling to the PCRF, where the signaling carries an event-trigger AVP field, and a value of the field indicates requesting subscription to information indicating a status change of the terminal, so that when a status of the terminal changes, the PCRF sends status information of the terminal to the PCEF, the PCRF sends, by using CCA or RAR signaling, a request for installing or updating a QoS rule to the BBERF, and the PCRF sends, by using CCA or RAR signaling, a request for installing or updating a PCC rule to the PCEF. Further, the signaling sent by the PCRF to the BBERF may further carry two event-trigger AVP fields, where a value of one of the two event-trigger AVP fields indicates requesting subscription to an event in which the terminal is in a suspended state, a value of the other event-trigger AVP field indicates requesting subscription to an event in which the terminal resumes to a normal state from a suspended state; or the PCRF may send, by using other signaling, a request for subscribing to an event in which a status of the terminal changes.

Step 1402: The PCRF is triggered to update a PCC rule and a QoS rule of the terminal, and sends RAR signaling to the BBERF, where the signaling carries a quality of service rule installing and/or removing request (QoS-Rule-Install AVP and/or QoS-Rule-Remove AVP).

Optionally, the signaling may further include an event-trigger AVP field, and a value of the field indicates requesting subscription to information indicating that the terminal resumes to a normal state from a suspended state.

Step 1403: The terminal is suspended, and an MME sends suspend notification information to the S-GW.

Step 1404: The BBERF sends RAA signaling to the PCRF, where the signaling indicates an update failure, the signaling further includes an event-trigger AVP field, and a value of the field indicates that the terminal is in a suspended state.

The PCRF stores status information of the terminal, and determines temporarily not to send a request for updating the QoS rule to the BBERF, and not to send a request for updating the PCC rule to the PCEF.

Step 1405 to step 1411 are similar to the foregoing step 1205 to step 1211, and details are not described herein again.

In the foregoing embodiment, step 1402 and step 1403 may be sequentially interchangeable, step 1404 and step 1405 may be sequentially interchangeable, step 1407 and step 1408 may be sequentially interchangeable, and step 1409 and step 1410 may be sequentially interchangeable.

In addition, to resolve the foregoing problem, an embodiment of this application further provides a rule management method, to resolve a problem that when a terminal is suspended and there is a request for updating a PCC rule and/or a QoS rule, signaling interaction is frequent, and resources are wasted.

The method may be applied to an LTE communications system, a 5G communications system, or future other communications systems. This is not limited in this application.

Figure 15:
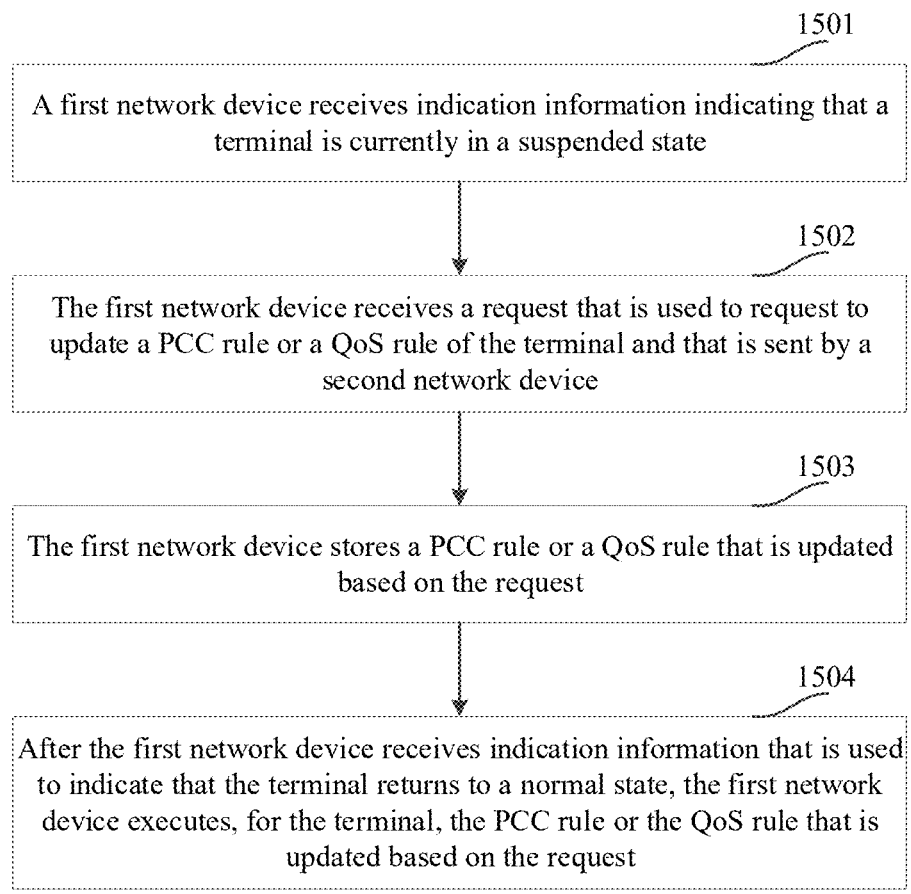
FIG. 15 is a schematic flowchart of another rule management method according to an embodiment of this application.

FIG. 15 is a schematic flowchart of a rule management method according to an embodiment of this application. As shown in FIG. 15, the method may include the following steps:

Step 1501: A first network device receives indication information indicating that a terminal is in a suspended state.

Step 1502: The first network device receives a request that is used to request to update a PCC rule or a QoS rule of the terminal and that is sent by a second network device.

Step 1503: The first network device stores a PCC rule or a QoS rule that is updated based on the request.

Step 1504: After the first network device receives indication information that indicates that the terminal resumes to a normal state, the first network device executes, for the terminal, the PCC rule or the QoS rule that is updated based on the request.

Specifically, when a PCC architecture includes a BBERF, as shown in FIG. 3, when the terminal is suspended, an MME sends indication information to an S-GW (the BBERF is disposed in the S-GW, and the BBERF is the first network device), to indicate that the terminal is in a suspended state.

In a conventional PCC architecture, when the terminal is suspended, a PCRF (the second network device) sends a request for updating the QoS rule of the terminal to the BBERF. Because the BBERF cannot establish or modify a corresponding SDF based on an updated QoS rule, the BBERF returns an update failure response to the PCRF.

In the foregoing embodiment of this application, when the terminal is suspended, if the PCRF sends a request for updating the QoS rule of the terminal to the BBERF, the BBERF first stores an updated QoS rule, but does not execute the updated QoS rule. After the BBERF receives indication information that indicates that the terminal resumes to a normal state and that is sent by the MME, the BBERF executes the updated QoS rule for the terminal, and establishes or modifies a corresponding SDF between the terminal and the BBERF based on the updated QoS rule.

When the PCC architecture includes the BBERF, if the PCEF updates the PCC rule of the terminal, because the PCEF does not need to interact with the terminal, even if the terminal is in a suspended state, after receiving the request that is used for updating the PCC rule and that is sent by the PCRF, the PCEF can still successfully update the PCC rule.

When the PCC architecture does not include the BBERF, as shown in FIG. 4, when the terminal is suspended, the MME sends indication information to the S-GW, the S-GW further sends indication information to the P-GW (the PCEF is disposed in the P-GW, and the PCEF is the first network device), to indicate that the terminal is in a suspended state.

In a conventional PCC architecture, when the terminal is suspended, if the PCRF (the second network device) sends a request for updating the PCC rule of the terminal to the PCEF, because the PCEF cannot execute an updated PCC rule for the terminal, the PCEF replies to the PCRF with an update failure response.

In the foregoing embodiment of this application, when the terminal is suspended, if the PCRF sends a request for updating the PCC rule of the terminal to the PCEF, the PCEF first stores a PCC rule that is updated based on the request, but does not execute the updated PCC rule. After the PCEF receives indication information that indicates that the terminal resumes to a normal state and that is sent by the S-GW, the PCEF executes the updated PCC rule for the terminal.

Optionally, after the foregoing step 1502, in other words, after the first network device (the BBERF or the PCEF) receives the request for updating the PCC rule or the QoS rule of the terminal, the first network device starts a timer based on a preset time. If the indication information indicating that the terminal resumes to a normal state is still not received when the timer expires, the first network device sends indication information to the second network device (the PCRF), to indicate that the terminal is in a suspended state, and update of the rule fails.

After receiving the indication information indicating that the terminal is in a suspended state and update of the rule fails, the second network device determines that the first network device has an update failure, and there is a need to resend a request for updating the rule. However, because the terminal is still in a suspended state, the second network device delays sending the request.

Further, after receiving the indication information indicating that the terminal resumes to a normal state, the first network device sends status information of the terminal to the second network device, and the second network device resends a request for updating the rule.

In a conventional PCC architecture, after receiving the request for updating the PCC rule or the QoS rule, the BBERF or the PCEF executes a new charging rule, and then provides new quality of service for the terminal based on an updated rule; and if execution fails, an update failure is reported to the PCRF, but the updated rule is not stored.

However, in the foregoing embodiment of this application, after the BBERF or the PCEF receives the request for updating the PCC rule or the QoS rule, if the terminal is in a suspended state and therefore the updated rule cannot be immediately executed, the updated rule is first stored, and a new rule is not executed until the terminal resumes to a normal state. According to the method, signaling interaction can be reduced, and waste of resources is avoided.

Figure 16:
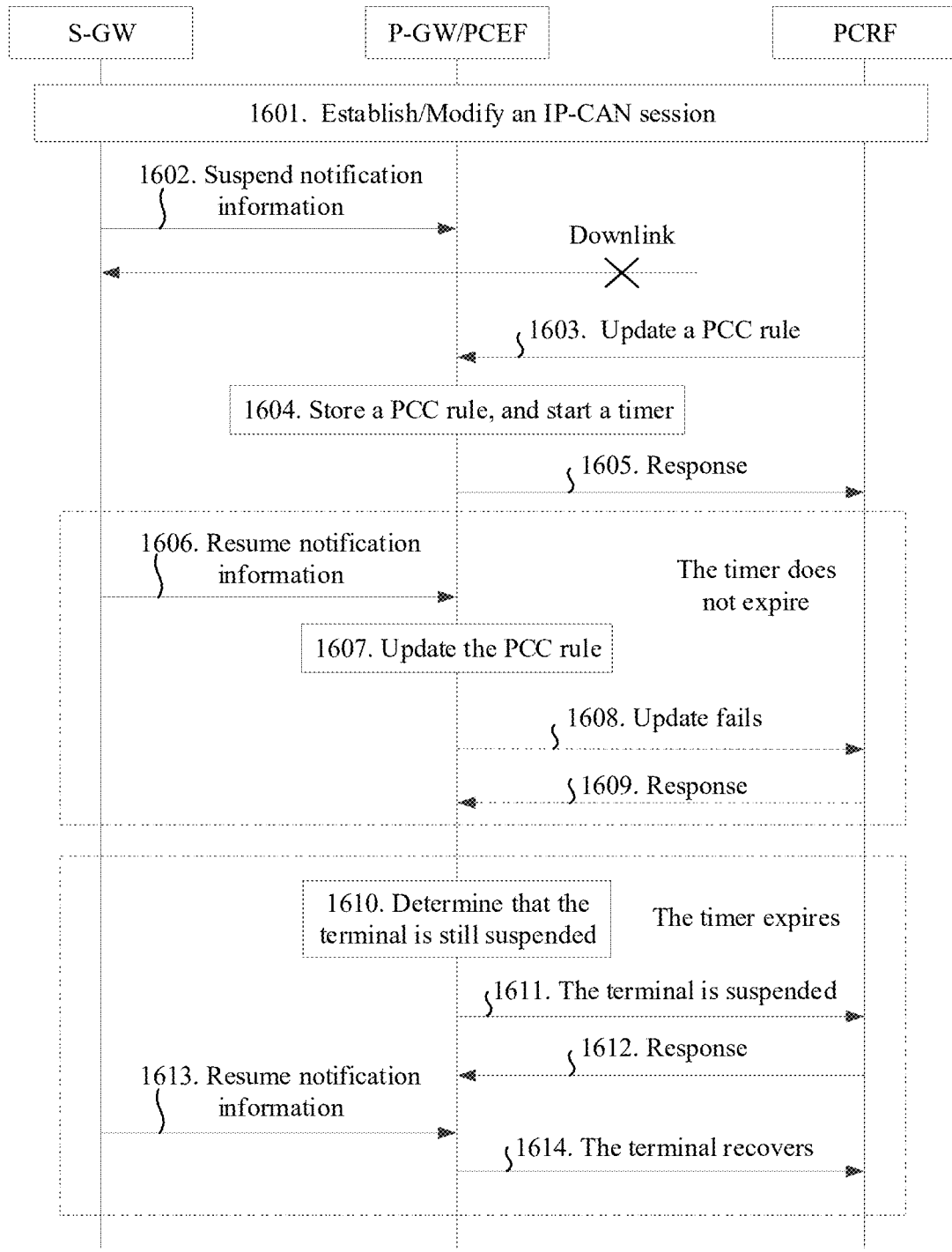
FIG. 16 is a schematic flowchart of another rule management method according to an embodiment of this application.
Figure 17:
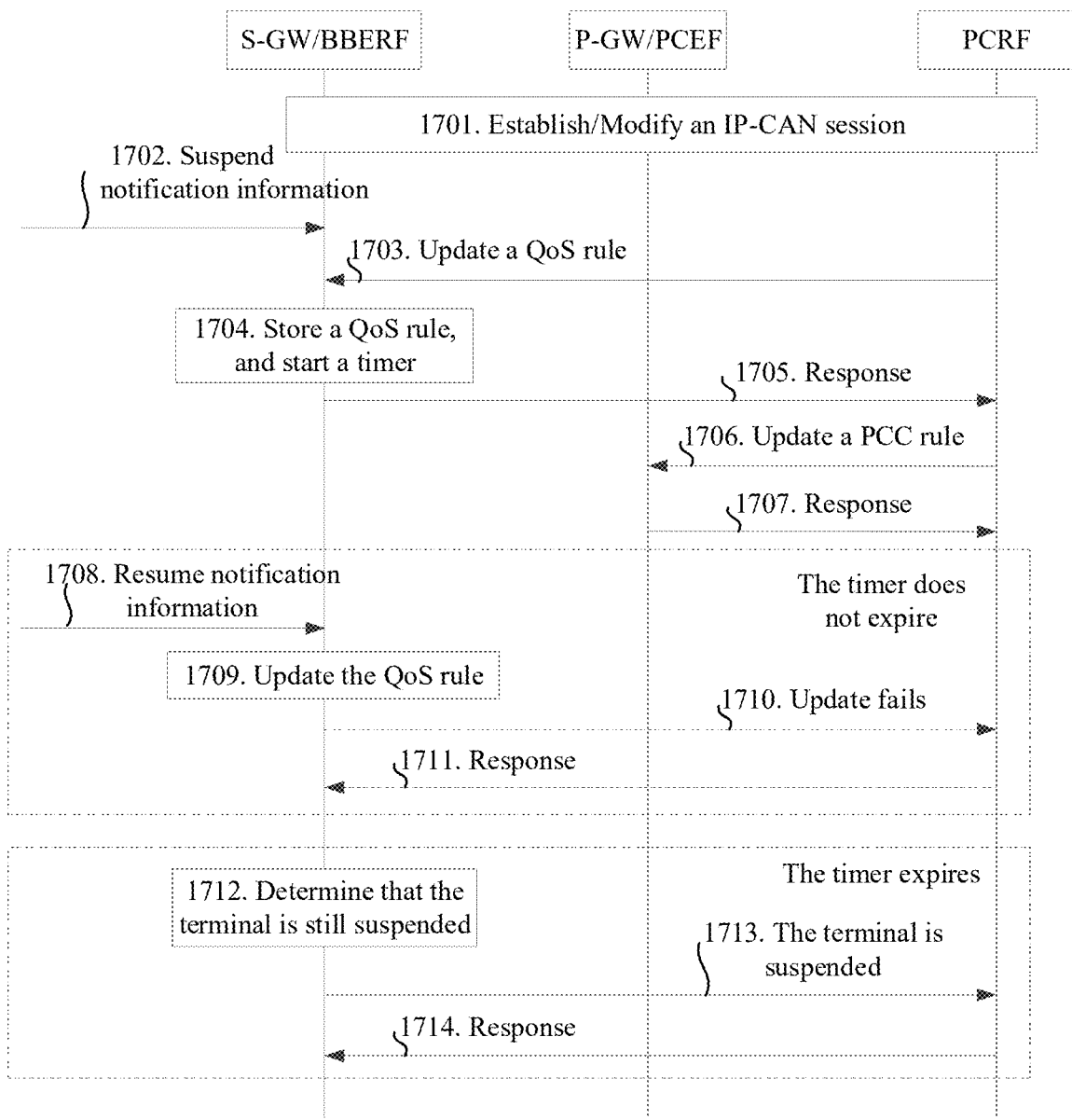
FIG. 17 is a schematic flowchart of another rule management method according to an embodiment of this application.

To clearly understand the rule management method provided in the foregoing embodiment of this application, the following further describes the rule management method by using examples in FIG. 16 and FIG. 17.

FIG. 16 is a schematic flowchart of a rule management method in a case in which a PCC architecture does not include a BBERF, where:

Step 1601: An S-GW, a P-GW, and a PCRF are triggered to create or modify an IP-CAN session of a terminal.

Specifically, when the IP-CAN session is created or modified, the PCRF sends, by using CCA or RAR signaling, a request for installing or updating a PCC rule to a PCEF.

Step 1602: The terminal is suspended, and the S-GW sends suspend notification information to the P-GW (the PCEF is disposed in the P-GW).

Step 1603: The PCRF is triggered to update the PCC rule of the terminal, and sends RAR signaling to the PCEF, where the signaling includes a policy and charging control rule installing and/or removing request (Charging-Rule-Install AVP and/or Charging-Rule-Remove AVP), and the request is used to request to update the PCC rule.

Step 1604: After receiving the update request, the PCEF stores a PCC rule included in the request, and starts a timer.

Step 1605: The PCEF returns response information to the PCRF, to indicate that update of the rule succeeds.

Step 1606: After the terminal resumes to a normal state, the S-GW sends a modify bearer request or resume notification information to the P-GW. In this case, if the timer does not expire, step 1607 is performed, otherwise, step 1610 is performed.

Step 1607: The PCEF executes an updated PCC rule for the terminal based on the stored rule.

Step 1608: If the PCEF has an update failure, the PCEF sends CCR signaling to the PCRF, to notify the PCRF that update of the rule fails.

Step 1609: The PCRF returns response information to the PCEF.

Optionally, the response information may carry a request for updating the PCC rule.

Step 1610: If the timer expires and indication information indicating that the terminal resumes to a normal state is not received, the PCEF determines that the terminal is still in a suspended state.

Step 1611: The PCEF sends CCR signaling to the PCRF, where the signaling indicates an update failure, and a failure reason is that the terminal is in a suspended state.

Step 1612: The PCRF stores status information of the terminal, determines temporarily not to send a request for updating the rule to the PCEF, and replies to the PCEF with response information.

Step 1613: After the terminal resumes to a normal state, the S-GW sends a modify bearer request or resume notification information to the P-GW.

Step 1614: The PCEF sends CCR signaling to the PCRF, where the signaling carries an event-trigger AVP field, and a value of the field indicates that the terminal resumes to a normal state.

FIG. 17 is a schematic flowchart of a rule management method in a case in which a PCC architecture includes a BBERF, where:

Step 1701: An S-GW, a P-GW, and a PCRF are triggered to create or modify an IP-CAN session of a terminal.

Specifically, when the IP-CAN session is created or modified, the PCRF sends, by using CCA or RAR signaling, a request for installing or updating a QoS rule to a BBERF, and the PCRF sends, by using CCA or RAR signaling, a request for installing or updating a PCC rule to a PCEF.

Step 1702: The terminal is suspended, and an MME sends suspend notification information to the S-GW (the BBERF is disposed in the S-GW).

Step 1703: The PCRF is triggered to update a PCC rule and a QoS rule of the terminal, and the PCRF sends RAR signaling to the BBERF, where the signaling carries a quality of service rule installing and/or removing request (QoS-Rule-Install AVP and/or QoS-Rule-Remove AVP), that is, used to request the BBERF to update the QoS rule.

Optionally, the signaling may further include an event-trigger AVP field, where a value of the field indicates requesting subscription to information indicating that the terminal resumes to a normal state from a suspended state.

Step 1704: After receiving the update request, the BBERF stores a QoS rule included in the request, and starts a timer.

Step 1705: The BBERF returns response information to the PCRF, to indicate that update of the rule succeeds.

Step 1706: The PCRF sends a policy and charging control rule installing and/or removing request to the PCEF.

Step 1707: The PCEF updates the PCC rule of the terminal based on the request, and sends a response to the PCRF, to indicate that update succeeds.

The foregoing step 1703 to step 1705 may be sequentially interchangeable with step 1706 to step 1707.

Step 1708: The BBERF receives resume notification information of the terminal that is sent by the MME, and the timer does not expire.

Step 1709: The BBERF updates the QoS rule of the terminal based on the quality of service rule installing and/or removing request.

Step 1710: If the BBERF has an update failure, the BBERF sends signaling to the PCRF, to notify that update of the rule fails.

Step 1711: The PCRF returns response information to the BBERF.

Step 1712: If the timer expires and indication information indicating that the terminal resumes to a normal state is not received, the BBERF determines that the terminal is still in a suspended state.

Step 1713: The BBERF sends CCR signaling to the PCRF, where the signaling indicates an update failure, and a failure reason is that the terminal is in a suspended state.

Step 1714: The PCRF stores status information of the terminal, determines temporarily not to send a request for updating the rule to the BBERF, and replies to the BBERF with response information.

Figure 18:
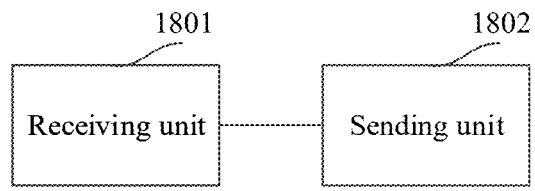
FIG. 18 is a schematic structural diagram of a first network device according to an embodiment of this application.

Based on a same technical concept, an embodiment of this application further provides a first network device, configured to implement a method procedure performed by the first network device in the foregoing method embodiments. FIG. 18 is a schematic structural diagram of a first network device according to an embodiment of this application. As shown in FIG. 18, the first network device includes a receiving unit 1801 and a sending unit 1802.

Specifically, the receiving unit 1801 is configured to receive first indication information, where the first indication information is used to indicate that a terminal is in a suspended state.

The sending unit 1802 is configured to send second indication information to a second network device, where the second indication information is used to indicate that the terminal is in a suspended state, so that the second network device does not send a request for updating a policy and charging control rule and/or a quality of service rule of the terminal.

In a possible implementation, after the sending unit 1802 sends the second indication information to the second network device, the receiving unit 1801 is further configured to receive third indication information, where the third indication information is used to indicate status resumption of the terminal.

The sending unit 1802 is further configured to send fourth indication information to the second network device, where the fourth indication information is used to indicate that the terminal resumes to a normal state from a suspended state, so that when there is a need to update the policy and charging control rule and/or the quality of service rule of the terminal, the second network device sends a request for updating the policy and charging control rule or the quality of service rule of the terminal to the first network device.

In a possible implementation, before the sending unit 1802 sends the second indication information to the second network device, the receiving unit 1801 is further configured to receive a first request sent by the second network device, where the first request is used to request to install or update the policy and charging control rule or the quality of service rule of the terminal.

In a possible implementation, the first request is further used to request subscription to information indicating that the terminal resumes to a normal state from a suspended state, so that when the terminal resumes to a normal state from a suspended state, the first network device sends status information of the terminal to the second network device; or the first request is further used to request subscription to status information of the terminal, so that when a status of the terminal changes, the first network device sends the status information of the terminal to the second network device.

In a possible implementation, before the sending unit 1802 sends the second indication information to the second network device, the receiving unit 1801 is further configured to: receive a second request sent by the second network device, where the second request is used to subscribe to status information of the terminal, so that when a status of the terminal changes, the first network device sends status information of the terminal to the second network device; or the second request is used to subscribe to information indicating that the terminal resumes to a normal state from a suspended state, so that when the terminal resumes to a normal state from a suspended state, the first network device sends status information of the terminal to the second network device.

Figure 19:
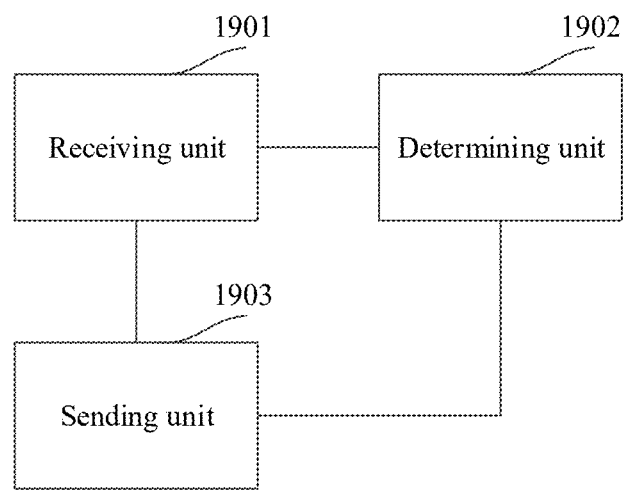
FIG. 19 is a schematic structural diagram of a second network device according to an embodiment of this application.

Based on a same technical concept, an embodiment of this application further provides a second network device, configured to implement a method procedure performed by the second network device in the foregoing method embodiments. FIG. 19 is a schematic structural diagram of a second network device according to an embodiment of this application. As shown in FIG. 19, the second network device includes a receiving unit 1901 and a determining unit 1902. Further, the second network device may further include a sending unit 1903.

Specifically, the receiving unit 1901 is configured to receive first indication information sent by a first network device, where the first indication information is used to indicate that a terminal is in a suspended state.

The determining unit 1902 is configured to determine, based on the first indication information, not to send a request for updating a policy and charging control rule and/or a quality of service rule of the terminal.

In a possible implementation, after the determining unit 1902 determines, based on the first indication information, not to send the request for updating the policy and charging control rule and/or the quality of service rule of the terminal, the receiving unit 1901 is further configured to receive second indication information sent by the first network device, where the second indication information is used to indicate status resumption of the terminal.

The sending unit 1903 is configured to: when the determining unit 1902 determines that there is a need to update the policy and charging control rule and/or the quality of service rule of the terminal, send a request for updating the policy and charging control rule or the quality of service rule of the terminal to the first network device.

In a possible implementation, before the receiving unit 1901 receives the first indication information sent by the first network device, the sending unit 1903 is further configured to send a first request to the first network device, where the first request is used to request to install or update the policy and charging control rule or the quality of service rule of the terminal.

In a possible implementation, the first request is further used to subscribe to information indicating that the terminal resumes to a normal state from a suspended state, so that when the terminal resumes to a normal state from a suspended state, the first network device sends status information of the terminal to the second network device; or the first request is further used to request subscription to status information of the terminal, so that when a status of the terminal changes, the first network device sends the status information of the terminal to the second network device.

In a possible implementation, before the receiving unit 1901 receives the first indication information sent by the first network device, the sending unit 1903 is further configured to send a second request to the first network device, where the second request is used to request subscription to status information of the terminal, so that when a status of the terminal changes, the first network device sends status information of the terminal to the second network device: or the second request is used to subscribe to information indicating that the terminal resumes to a normal state from a suspended state, so that when the terminal resumes to a normal state from a suspended state, the first network device sends status information of the terminal to the second network device.

In a possible implementation, the determining unit 1902 is specifically configured to: determine, based on the first indication information, not to send a request for updating the quality of service rule of the terminal to the first network device; and determine, based on the first indication information, not to send a request for updating the policy and charging control rule of the terminal to a third network device.

In a possible implementation, before receiving the first indication information sent by the first network device, the receiving unit 1901 is further configured to:

receive a third request sent by the third network device, where the third request is used to subscribe to status information of the terminal, so that when a status of the terminal changes, the second network device sends the status information of the terminal to the third network device.

After the receiving unit 1901 receives the first indication information sent by the first network device, the sending unit 1903 is further configured to:

send third indication information to the third network device, where the third indication information is used to indicate that the terminal is in a suspended state, so that the third network device does not send downlink data of the terminal to the first network device.

In a possible implementation, after the determining unit 1902 determines, based on the first indication information, not to send the request for updating the policy and charging control rule and the quality of service rule of the terminal, the receiving unit 1901 is further configured to receive second indication information sent by the first network device, where the second indication information is used to indicate status resumption of the terminal.

The sending unit 1903 is further configured to send fourth indication information to the third network device, where the second indication information is used to indicate status resumption of the terminal, so that the third network device sends downlink data of the terminal to the first network device.

Figure 20:
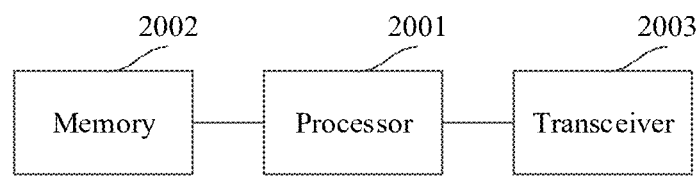
FIG. 20 is a schematic structural diagram of a first network device according to an embodiment of this application.

Based on a same technical concept, an embodiment of this application further provides a first network device, configured to implement a method procedure performed by the first network device in the foregoing method embodiments. FIG. 20 is a schematic structural diagram of a first network device according to an embodiment of this application. As shown in FIG. 20, the first network device includes a processor 2001, and a memory 2002 and a transceiver 2003 that are connected to the processor 2001.

The processor 2001 is configured to read a computer program prestored in the memory 2002, to perform the following operations:

receiving first indication information by using the transceiver 2003, where the first indication information is used to indicate that a terminal is in a suspended state; and sending second indication information to a second network device by using the transceiver 2003, where the second indication information is used to indicate that the terminal is in a suspended state, so that the second network device does not send a request for updating a policy and charging control rule and/or a quality of service rule of the terminal.

In a possible implementation, after sending the second indication information to the second network device by using the transceiver 2003, the processor 2001 is further configured to:

receive third indication information by using the transceiver 2003, where the third indication information is used to indicate status resumption of the terminal; and send fourth indication information to the second network device by using the transceiver 2003, where the fourth indication information is used to indicate status resumption of the terminal, so that when there is a need to update the policy and charging control rule and/or the quality of service rule of the terminal, the second network device sends a request for updating the policy and charging control rule or quality of service rule of the terminal to the first network device.

In a possible implementation, before sending the second indication information to the second network device by using the transceiver 2003, the processor 2001 is further configured to:

receive, by using the transceiver 2003, a first request sent by the second network device, where the first request is used to request to install or update the policy and charging control rule or the quality of service rule of the terminal.

In a possible implementation, the first request is further used to subscribe to information indicating that the terminal resumes to a normal state from a suspended state, so that when the terminal resumes to a normal state from a suspended state, the first network device sends status information of the terminal to the second network device; or the first request is further used to request subscription to status information of the terminal, so that when a status of the terminal changes, the first network device sends the status information of the terminal to the second network device.

In a possible implementation, before sending the second indication information to the second network device by using the transceiver 2003, the processor 2001 is further configured to:

send, by using the transceiver 2003, a second request sent by the second network device, where the second request is used to request subscription to status information of the terminal, so that when a status of the terminal changes, the first network device sends the status information of the terminal to the second network device; or the second request is used to subscribe to information indicating that the terminal resumes to a normal state from a suspended state, so that when the terminal resumes to a normal state from a suspended state, the first network device sends status information of the terminal to the second network device.

Figure 21:
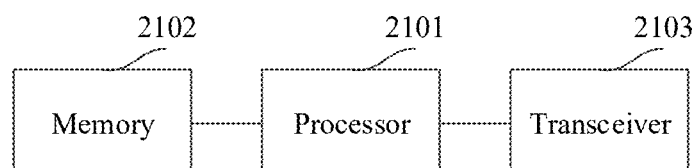
FIG. 21 is a schematic structural diagram of a second network device according to an embodiment of this application.

Based on a same technical concept, an embodiment of this application further provides a second network device, configured to implement a method procedure performed by the second network device in the foregoing method embodiments. FIG. 21 is a schematic structural diagram of a second network device according to an embodiment of this application. As shown in FIG. 21, the second network device includes a processor 2101, and a memory 2102 and a transceiver 2103 that are connected to the processor 2101.

The processor 2101 is configured to read a computer program prestored in the memory 2102, to perform the following operations:

receiving, by using the transceiver 2103, first indication information sent by the second network device, where the first indication information is used to indicate that a terminal is in a suspended state; and determining, based on the first indication information, not to send a request for updating a policy and charging control rule and/or a quality of service rule of the terminal.

In a possible implementation, after determining, based on the first indication information, not to send the request for updating the policy and charging control rule and/or the quality of service rule of the terminal, the processor 2101 is further configured to:

receive, by using the transceiver 2103, second indication information sent by the second network device, where the second indication information is used to indicate status resumption of the terminal; and when there is a need to update the policy and charging control rule and/or the quality of service rule of the terminal, send, by using the transceiver 2103, a request for updating the policy and charging control rule or a quality of service rule of the terminal to the second network device.

In a possible implementation, before receiving, by using the transceiver 2103, the first indication information sent by the second network device, the processor 2101 is further configured to:

send, by using the transceiver 2103, a first request to the second network device, where the first request is used to request to install or update the policy and charging control rule or the quality of service rule of the terminal.

In a possible implementation, the first request is further used to subscribe to information indicating that the terminal resumes to a normal state from a suspended state, so that when the terminal resumes to a normal state from a suspended state, the second network device sends status information of the terminal to the first network device; or the first request is further used to request subscription to status information of the terminal, so that when a status of the terminal changes, the second network device sends the status information of the terminal to the first network device.

In a possible implementation, before receiving, by using the transceiver 2103, the first indication information sent by the second network device, the processor 2101 is further configured to:

send, by using the transceiver 2103, a second request to the second network device, where the second request is used to request subscription to status information of the terminal, so that when a status of the terminal changes, the second network device sends the status information of the terminal to the first network device; or the second request is used to subscribe to information indicating that the terminal resumes to a normal state from a suspended state, so that when the terminal resumes to a normal state from a suspended state, the first network device sends status information of the terminal to the second network device.

In a possible implementation, after determining, based on the first indication information, not to send the request for updating the policy and charging control rule and/or the quality of service rule of the terminal, the processor 2101 is further configured to:

determine, based on the first indication information, not to send a request for updating the quality of service rule of the terminal to the second network device; and determine, based on the first indication information, not to send a request for updating the policy and charging control rule of the terminal to a third network device.

In a possible implementation, before receiving, by using the transceiver 2103, the first indication information sent by the second network device, the processor 2101 is further configured to:

receive, by using the transceiver 2103, a third request sent by the third network device, where the third request is used to subscribe to status information of the terminal, so that when a status of the terminal changes, the first network device sends the status information of the terminal to the third network device.

Before receiving, by using the transceiver 2103, the first indication information sent by the second network device is received, the processor 2101 is further configured to:

send third indication information to the third network device by using the transceiver 2103, where the third indication information is used to indicate that the terminal is in a suspended state, so that the third network device does not send downlink data of the terminal to the second network device.

In a possible implementation, after determining, based on the first indication information, not to send the request for updating the policy and charging control rule and the quality of service rule of the terminal, the processor 2101 is further configured to:

receive, by using the transceiver 2103, second indication information sent by the second network device, where the second indication information is used to indicate status resumption of the terminal; and send fourth indication information to the third network device by using the transceiver 2103, where the second indication information is used to indicate status resumption of the terminal, so that the third network device sends downlink data of the terminal to the second network device.

Figure 22:
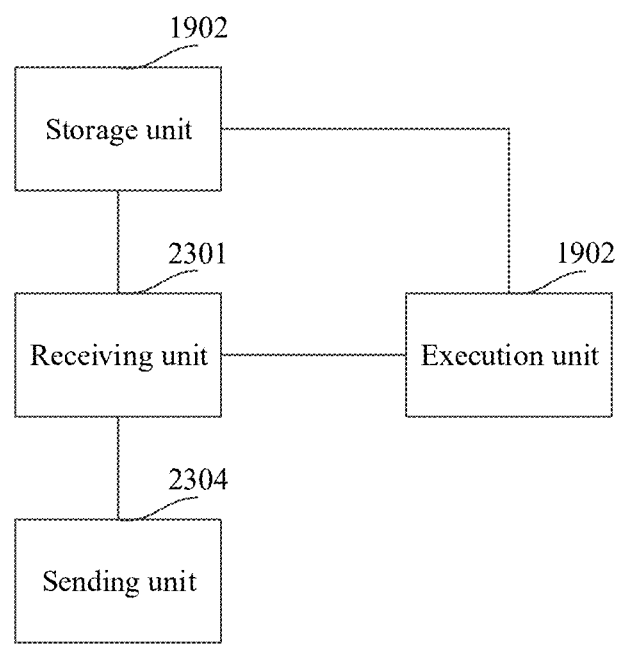
FIG. 22 is a schematic structural diagram of another first network device according to an embodiment of this application.

Based on a same technical concept, an embodiment of this application further provides a first network device, configured to implement a method procedure performed by the first network device in the foregoing method embodiments. FIG. 22 is a schematic structural diagram of a first network device according to an embodiment of this application. As shown in FIG. 22, the first network device includes a receiving unit 2201, a storage unit 2202, and an execution unit 2203. Further, the second network device may further include a sending unit 2204.

Specifically, the receiving unit 2201 is configured to: receive first indication information, where the first indication information is used to indicate that a terminal is in a suspended state; receive a request that is used for updating a policy and charging control rule or a quality of service rule of the terminal and that is sent by the second network device: and receive second indication information, where the second indication information is used to indicate status resumption of the terminal.

The storage unit 2202 is configured to store a policy and charging control rule or a quality of service rule that is updated based on the request.

The execution unit 2203 is configured to: when the receiving unit 2201 receives second indication information, execute, for the terminal, the policy and charging control rule or the quality of service rule of the terminal that is updated based on the request.

In a possible implementation, if the receiving unit 2201 does not receive the second indication information within a preset time, the sending unit 2204 is configured to send third indication information to the second network device, where the third indication information is used to indicate that the terminal is in a suspended state, so that the second network device does not send the request for updating the policy and charging control rule or the quality of service rule of the terminal.

Figure 23:
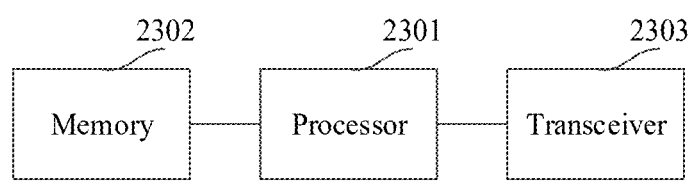
FIG. 23 is a schematic structural diagram of another first network device according to an embodiment of this application.

Based on a same technical concept, an embodiment of this application further provides a first network device, configured to implement a method procedure performed by the first network device in the foregoing method embodiments. FIG. 23 is a schematic structural diagram of a first network device according to an embodiment of this application. As shown in FIG. 23, the first network device includes a processor 2301, and a memory 2302 and a transceiver 2303 that are connected to the processor 2301.

The processor 2301 is configured to read a computer program prestored in the memory 2302, to perform the following operations:

receiving, by using the transceiver 2302, first indication information, where the first indication information is used to indicate that a terminal is in a suspended state;

receiving, by using the transceiver 2302, a request that is used for updating a policy and charging control rule or a quality of service rule of the terminal and that is sent by a second network device:

storing, in the memory, a policy and charging control rule or a quality of service rule that is updated based on the request; and when second indication information is received by using the transceiver 2302, executing, for the terminal, the policy and charging control rule or the quality of service rule of the terminal that is updated based on the request, where the second indication information is used to indicate status resumption of the terminal.

In a possible implementation, the processor 2301 is further configured to:

if the second indication information is not received by using the transceiver 2302 within a preset time, send third indication information to the second network device by using the transceiver 2302, where the third indication information is used to indicate that the terminal is in a suspended state, so that the second network device does not send a request for updating the policy and charging control rule or the quality of service rule of the terminal.

A person skilled in the art should understand that the embodiments of this application may be provided as a method, a system, or a computer program product. Therefore, this application may use a form of hardware only embodiments, software only embodiments, or embodiments with a combination of software and hardware. Moreover, this application may use a form of a computer program product that is implemented on one or more computer-usable storage media (including but not limited to a disk memory, a CD-ROM, an optical memory, and the like) that include computer usable program code.

This application is described with reference to the flowcharts and/or block diagrams of the method, the device (system), and the computer program product according to this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a special-purpose computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Obviously, a person skilled in the art can make various modifications and variations to this application without departing from the spirit and scope of this application. This application is intended to cover these modifications and variations of this application provided that they fall within the scope of protection defined by the following claims and their equivalent technologies.

What is claimed is:

1. A rule management method, comprising:
   receiving, by a first network device, a first request from a second network device, wherein the first request requests to install or update a policy and charging control rule or a quality of service rule of a terminal;
   receiving, by the first network device, first indication information, wherein the first indication information indicates that the terminal is in a suspended state;
   starting, by the first network device, a timer;
   in response to determining that the terminal has not resumed a normal state from the suspended state when the timer expires, sending, by the first network device, second indication information to the second network device, wherein the second indication information indicates that the terminal is in the suspended state, and the second indication information causes the second network device to forgo sending a request for updating the policy and charging control rule or the quality of service rule of the terminal;
   receiving, by the first network device, third indication information, wherein the third indication information indicates status resumption of the terminal; and
   sending, by the first network device, fourth indication information to the second network device, wherein the fourth indication information indicates the status resumption of the terminal, and the fourth indication information causes the second network device to send the request for updating the policy and charging control rule or the quality of service rule of the terminal to the first network device in response to determining that there is a need to update the policy and charging control rule or the quality of service rule of the terminal.

2. The method according to claim 1, wherein the first request further requests subscribing to information indicating that the terminal resumes a normal state from the suspended state, and the first request causes the first network device to send status information of the terminal to the second network device in response to detecting that the terminal returns to the normal state from the suspended state.

3. The method according to claim 1, wherein the method further comprises:

receiving, by the first network device, a second request from the second network device, wherein the second request requests subscribing to information indicating that the terminal resumes to a normal state from the suspended state, and the second request causes the first network device to send status information of the terminal to the second network device in response to detecting that the terminal returns to the normal state from the suspended state.

4. The method according to claim 1, wherein the first network device comprises policy and charging enforcement function (PCEF) or a packet data network gateway (P-GW), and the second network device comprises a policy control function (PCF).

5. The method according to claim 1, wherein receiving, by the first network device, the first request from the second network device comprises receiving, by the first network device, the first request from the second network device after receiving, by the first network device, the first indication information.

6. A network device, comprising at least one processor and at least one memory and a transceiver that are connected to the at least one processor; wherein the at least one memory stores programming instructions for execution by the at least one processor, wherein the programming instructions instruct the at least one processor to perform operations comprising:

receiving a first request from a second network device, wherein the first request requests to install or update a policy and charging control rule or a quality of service rule of a terminal;

receiving first indication information using the transceiver, wherein the first indication information indicates that the terminal is in a suspended state;

starting a timer;

in response to determining that the terminal has not resumed a normal state from the suspended state when the timer expires, sending second indication information to the second network device using the transceiver, wherein the second indication information indicates that the terminal is in the suspended state, and the second indication information causes the second network device to forgo sending a request for updating the policy and charging control rule or the quality of service rule of the terminal;

receiving third indication information, wherein the third indication information indicates status resumption of the terminal; and sending fourth indication information to the second network device, wherein the fourth indication information indicates the status resumption of the terminal, and the fourth indication information causes the second network device to send the request for updating the policy and charging control rule or the quality of service rule of the terminal to the network device in response to determining that there is a need to update the policy and charging control rule or the quality of service rule of the terminal.

7. The network device according to claim 6, wherein the first request further requests subscribing to information indicating that the terminal resumes to a normal state from the suspended state, and the first request causes the network device to send status information of the terminal to the second network device in response to detecting that the terminal resumes to a normal state from the suspended state.

8. The network device according to claim 6, wherein the operations further comprise:

receiving, using the transceiver, a second request from the second network device, wherein the second request requests subscribing to information indicating that the terminal resumes to a normal state from the suspended state, and the second request causes the network device to send status information of the terminal to the second network device in response to detecting that the terminal resumes to a normal state from the suspended state.

9. A rule management system, comprising a first network device and a second network device, wherein the first network device is configured to:
receive a first request from the second network device, wherein the first request requests to install or update a policy and charging control rule or a quality of service rule of a terminal;
receive first indication information, wherein the first indication information indicates that the terminal is in a suspended state;
start a timer;
in response to determining that the terminal has not resumed a normal state from the suspended state when the timer expires, send second indication information to the second network device, wherein the second indication information indicates that the terminal is in the suspended state;
receive third indication information, wherein the third indication information indicates status resumption of the terminal; and
send fourth indication information to the second network device, wherein the fourth indication information indicates the status resumption of the terminal; and the second network device is configured to:
send the first request to the first network device;
receive the second indication information;
in response to determining that the first indication information indicates that the terminal is in the suspended state, determine to forgo sending a request for updating the policy and charging control rule or the quality of service rule of the terminal; and
in response to receiving the fourth indication information, send the request for updating the policy and charging control rule or the quality of service rule of the terminal to the first network device in response to determining that there is a need to update the policy and charging control rule or the quality of service rule of the terminal.

* * * * *